United States Patent
Kanno

(10) Patent No.: US 9,626,141 B2
(45) Date of Patent: Apr. 18, 2017

(54) IMAGE FORMATION SYSTEM

(71) Applicant: Oki Data Corporation, Tokyo (JP)

(72) Inventor: Hideyuki Kanno, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/631,133

(22) Filed: Feb. 25, 2015

(65) Prior Publication Data

US 2015/0248260 A1    Sep. 3, 2015

(30) Foreign Application Priority Data

Feb. 28, 2014    (JP) .................................. 2014-038313

(51) Int. Cl.
| | |
|---|---|
| G06F 3/12 | (2006.01) |
| H04N 1/00 | (2006.01) |
| G06K 15/02 | (2006.01) |

(52) U.S. Cl.
CPC .......... *G06F 3/1287* (2013.01); *G06F 3/1207* (2013.01); *G06F 3/1239* (2013.01); *G06F 3/1259* (2013.01); *G06F 3/1292* (2013.01); *G06F 3/129* (2013.01); *G06F 3/1219* (2013.01); *G06F 3/1228* (2013.01)

(58) Field of Classification Search
None
See application file for complete search history.

(56) References Cited

U.S. PATENT DOCUMENTS

| | | | |
|---|---|---|---|
| 6,219,151 B1* | 4/2001 | Manglapus | H04L 41/0213 358/1.13 |
| 2002/0135807 A1* | 9/2002 | Idehara | H04N 1/00127 358/1.15 |
| 2004/0263898 A1* | 12/2004 | Ferlitsch | G06F 3/1207 358/1.15 |
| 2005/0237564 A1* | 10/2005 | Sugimoto | G06F 3/1205 358/1.15 |
| 2006/0132823 A1* | 6/2006 | Sakamoto | G06F 3/1222 358/1.14 |
| 2006/0290967 A1* | 12/2006 | Sumitomo | G03G 21/04 358/1.14 |

(Continued)

FOREIGN PATENT DOCUMENTS

JP    2012-248123 A    12/2012

*Primary Examiner* — Beniyam Menberu
(74) *Attorney, Agent, or Firm* — Mots Law, PLLC

(57) ABSTRACT

A external apparatus includes an image formation data generator to generate image formation data based on which a image formation apparatus is to form an image, a job generator to generate an image formation job by adding an address of the external apparatus to the image formation data generated by the image formation data generator, an image formation job output unit to send the image formation job generated by the job generator to the image formation apparatus, and a first receiver to receive notification information from the image formation apparatus. The image formation apparatus includes a second receiver to receive the image formation job from the external apparatus, and a notification information transmitter to generate the notification information concerning the image formation job received by the second receiver and to transmit the generated notification information to the address contained in the image formation job received by the second receiver.

10 Claims, 18 Drawing Sheets

(56) References Cited

U.S. PATENT DOCUMENTS

| | | | | |
|---|---|---|---|---|
| 2007/0247654 A1* | 10/2007 | Tian | G06F 3/1219 | 358/1.14 |
| 2010/0238493 A1* | 9/2010 | Sako | H04N 1/00838 | 358/1.15 |
| 2011/0211218 A1* | 9/2011 | Gilmore | G06F 3/1207 | 358/1.15 |
| 2011/0261397 A1* | 10/2011 | Marunouchi | G06F 3/1207 | 358/1.15 |
| 2013/0135675 A1* | 5/2013 | Hashimoto | H04N 1/0097 | 358/1.15 |
| 2013/0155442 A1* | 6/2013 | Kuppuswamy | H04N 1/00344 | 358/1.14 |
| 2014/0092431 A1* | 4/2014 | Okuno | G06F 3/1207 | 358/1.15 |
| 2014/0295766 A1* | 10/2014 | Matsumoto | H04W 4/008 | 455/41.3 |

* cited by examiner

FIG. 5
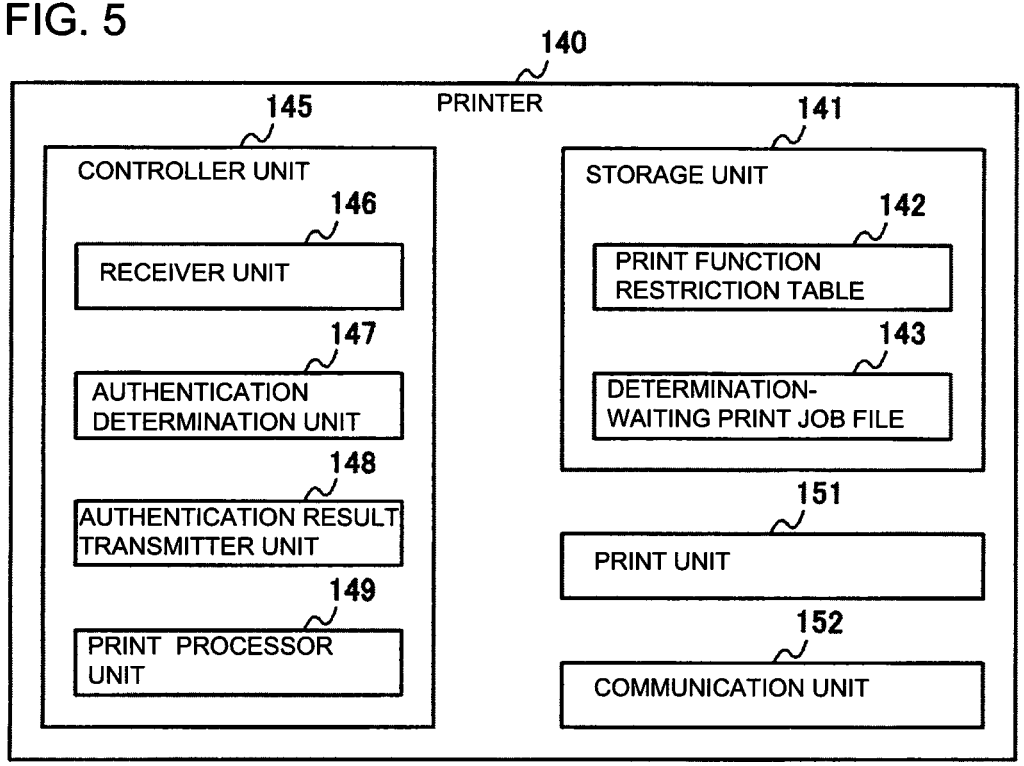
FIG. 6
| USER ID | RESTRICTION OF COLOR PRINTING AVAILABILITY |
|---------|---------------------------------------------|
| 0001 | AVAILABLE |
| 0002 | UNAVAILABLE |
| ⋮ | ⋮ |
| n | UNAVAILABLE |
FIG. 7
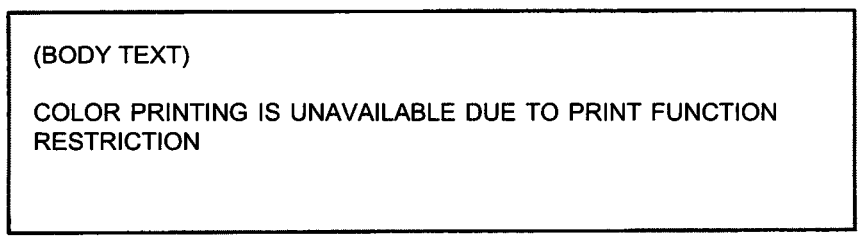

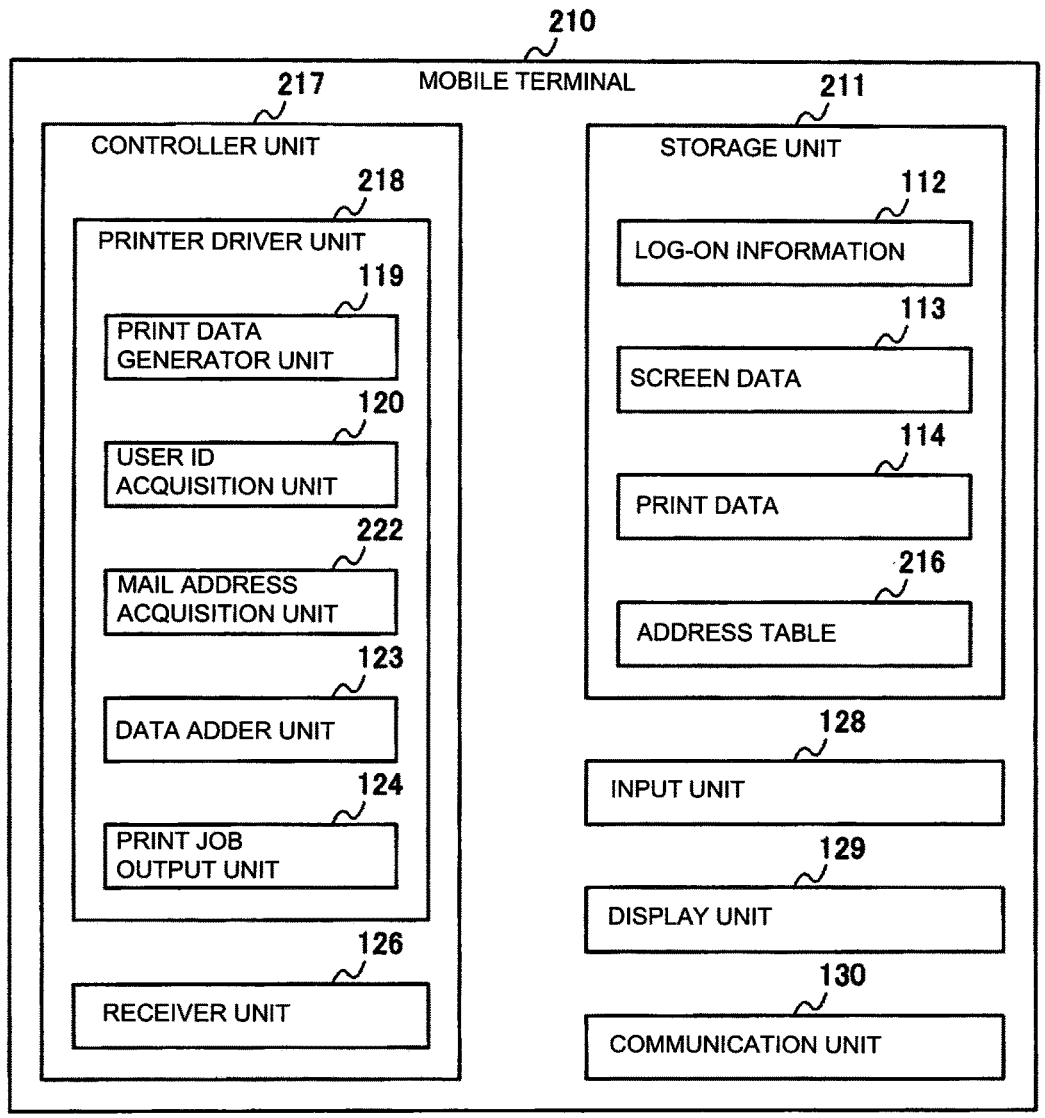

IMAGE FORMATION SYSTEM

CROSS REFERENCE TO RELATED APPLICATIONS

This application claims priority based on 35 USC 119 from prior Japanese Patent Application No. 2014-038313 filed on Feb. 28, 2014, entitled "IMAGE FORMATION SYSTEM", the entire contents of which are incorporated herein by reference.

BACKGROUND OF THE INVENTION

1. Field of the Invention

This disclosure relates to an image formation system.

2. Description of Related Art

Conventionally, when an image formation apparatus rejects printing of a print job received from a user terminal via a network due to print function restriction, the image formation apparatus sends a response indicating the above status to the user terminal by using a bidirectional communication function of the network. Then, the user terminal analyzes the status in the response from the image formation apparatus by using software, and notifies a user of an analysis result that "the printing has failed due to function restriction" (see Japanese Patent Application Publication No. 2012-248123, for example).

SUMMARY OF THE INVENTION

However, if software in a cloud or Internet environment does not support bidirectional communications, or if the software of the user terminal cannot analyze the format of the status in the response from the image formation apparatus, the user terminal cannot notify the user of the result of the response from the image formation apparatus, and therefore the user cannot know why the printing has failed.

An object of an embodiment of the invention is to enable an apparatus used by a user to receive a response from an image formation apparatus even if the user's apparatus does not have a bidirectional communication function.

A first aspect of the invention is an image formation system comprising an external apparatus and an image formation apparatus. The external apparatus comprises: an image formation data generator unit configured to generate image formation data based on which the image formation apparatus is to form an image; a job generator unit configured to generate an image formation job by adding an address of the external apparatus to the image formation data generated by the image formation data generator unit; an image formation job output unit configured to send the image formation job generated by the job generator unit to the image formation apparatus; and a first receiver unit configured to receive notification information from the image formation apparatus. The image formation apparatus comprises: a second receiver unit configured to receive the image formation job from the external apparatus; and a notification information transmitter unit configured to generate the notification information concerning the image formation job received by the second receiver unit, and transmit the generated notification information to the address contained in the image formation job received by the second receiver unit.

A second aspect of the invention is an image formation system comprising an external apparatus, a cloud server and an image formation apparatus. The external apparatus comprises: an image formation data generator unit configured to generate image formation data based on which the image formation apparatus is to form an image; a job generator unit configured to generate an image formation job by adding an address of the external apparatus to the image formation data generated by the image formation data generator unit; an image formation job output unit configured to send the image formation job generated by the job generator unit to the cloud server; and a first receiver unit configured to receive notification information from the image formation apparatus. The cloud server comprises: a second receiver unit configured to receive the image formation job from the external apparatus; and a transmitter unit configured to send the image formation job received by the second receiver unit to the image formation apparatus. The image formation apparatus comprises: a third receiver unit configured to receive the image formation job from the cloud server; and a notification information transmitter unit configured to generate the notification information concerning the image formation job received by the third receiver unit and send the generated notification information to the address contained in the image formation job received by the third receiver unit.

A third aspect of the invention is an image formation system comprising an external apparatus, a determination server, and an image formation apparatus. The external apparatus comprises: an image formation data generator unit configured to generate image formation data based on which the image formation apparatus is to form an image; a job generator unit configured to generate an image formation job by adding an address of the external apparatus to the image formation data generated by the image formation data generator unit; an image formation job output unit configured to send the image formation job generated by the job generator unit to the image formation apparatus; and a first receiver unit configured to receive notification information from the determination server. The image formation apparatus comprises: a second receiver unit configured to receive the image formation job from the external apparatus; and an inquiry unit configured to send inquiry information to the determination server, the inquiry information containing determination reference information necessary to determine whether or not to impose restriction on processing of the image formation job received by the second receiver unit, and the address contained in the image formation job received by the second receiver unit. The determination server comprises: a third receiver unit configured to receive the inquiry information from the image formation apparatus; a determination unit configured to determine whether or not to impose the restriction on the processing of the image formation job by using the determination reference information contained in the inquiry information received by the third receiver unit; and a result transmitter unit configured to generate the notification information indicating a result of determination made by the determination unit, and send the generated notification information to the address contained in the inquiry information received by the third receiver unit.

According to the above aspects of the invention, even if an apparatus used by a user does not have a bidirectional communication function, the user's apparatus can receive a response from the image formation apparatus.

BRIEF DESCRIPTION OF THE DRAWINGS

FIG. 5 is a block diagram schematically illustrating a configuration of a printer in Embodiment 1;

FIG. 6 is a schematic diagram presenting an example of a print function restriction table in Embodiment 1;

FIG. 7 is a schematic diagram illustrating an example of a content of an e-mail in Embodiment 1;

FIG. 12 is a block diagram schematically illustrating a configuration of a mobile terminal in Embodiment 2;

FIG. 13 is a schematic diagram illustrating an example of an address table in Embodiment 2;

DETAILED DESCRIPTION OF EMBODIMENTS

Figure 1:
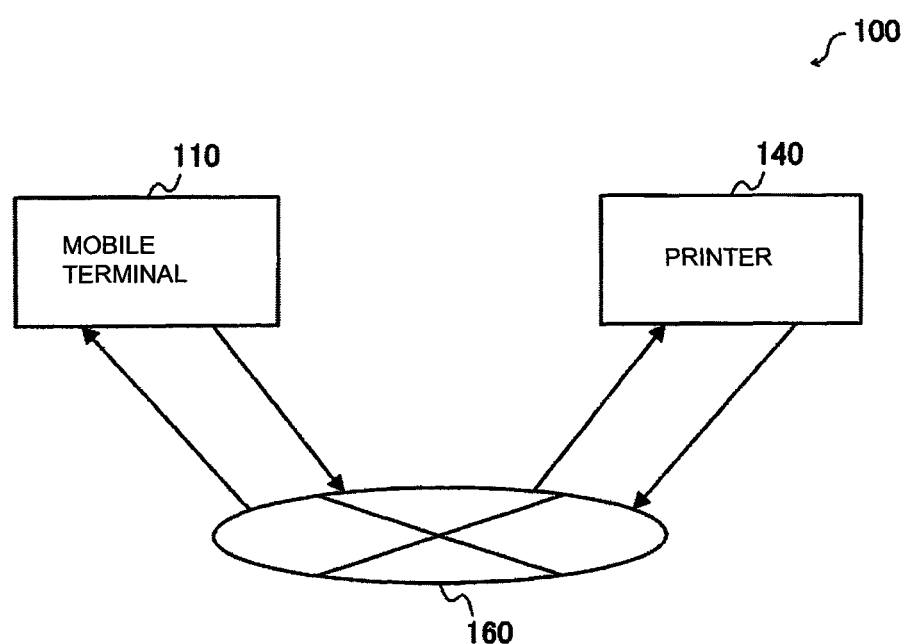
FIG. 1 is a schematic diagram of an information communication system according to Embodiment 1.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Embodiment 1.

FIG. 1 is a schematic diagram of information communication system 100 according to Embodiment 1. Information communication system 100 includes mobile terminal 110 as an external apparatus or a higher-level apparatus and printer 140 as an image formation apparatus. Mobile terminal 110 and printer 140 are connected to Internet 160.

Figure 2:
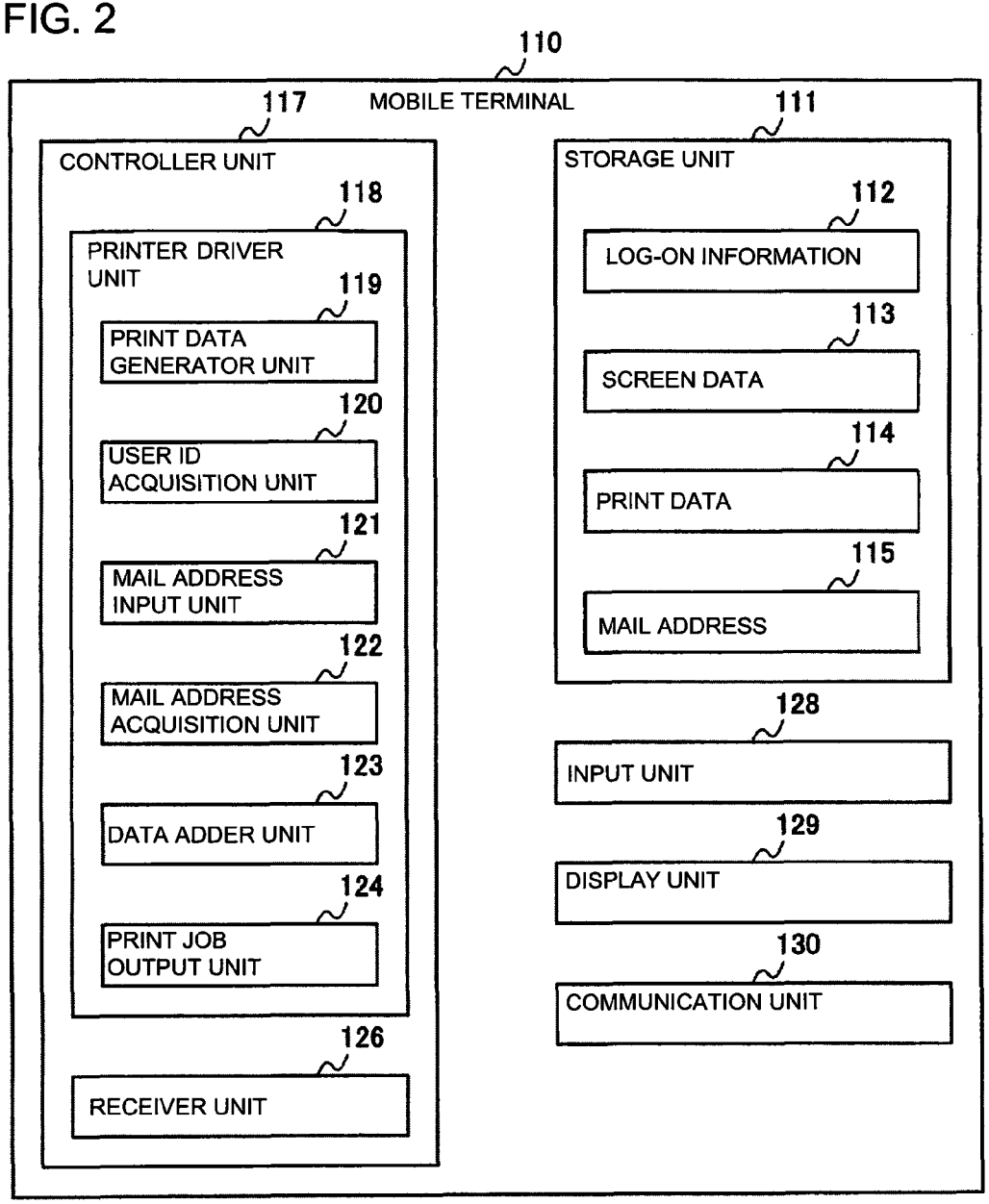
FIG. 2 is a block diagram schematically illustrating a configuration of a mobile terminal in Embodiment 1.

FIG. 2 is a block diagram schematically illustrating a configuration of mobile terminal 110. Mobile terminal 110 includes storage unit 111, controller unit 117, input unit 128, display unit 129, and communication unit 130.

Storage unit 111 stores information necessary for processing in mobile terminal 110. For example, storage unit 111 stores log-on information 112, screen data 113, print data 114, and mail address 115.

Log-on information 112 is information on a user of mobile terminal 110. Log-on information 112 includes a user ID as user identification information for identifying the user of mobile terminal 110. During an event such as a startup of mobile terminal 110, for example, log-on information 112 is inputted via input unit 128 and display unit 129, and is stored in storage unit 111.

Screen data 113 is data necessary to display screens on display unit 129. For example, screen data 113 includes commands and data of partial images to generate screen data for displaying the screens on display unit 129.

Print data 114 is image formation data based on which printer 140 is to make printing (image formation). Print data 114 is generated by controller unit 117.

Mail address 115 is an address (communication address) to send a mail to mobile terminal 110.

Controller unit 117 controls processing in mobile terminal 110. Controller unit 117 includes printer driver unit 118 and receiver unit 126.

Printer driver unit 118 generates a print job (image formation job) based on which printer 140 is to make printing, and sends the print job to printer 140. Printer driver unit 118 includes print data generator unit 119 as an image formation data generator unit, user ID acquisition unit 120 as a user identification information acquisition unit, mail address input unit 121 as an address input unit, mail address acquisition unit 122 as an address acquisition unit, data adder unit 123 as a job generator unit, and print job output unit 124 as an image formation job output unit.

Print data generator unit 119 generates print data based on which printer 140 is to make printing. Print data generator unit 119 stores the generated print data in storage unit 111. User ID acquisition unit 120 acquires the user ID as the user identification information. For example, using an application programming interface (API) of an operation system (OS), user ID acquisition unit 120 acquires the user ID from log-on information 112 stored in storage unit 111.

Figure 3:
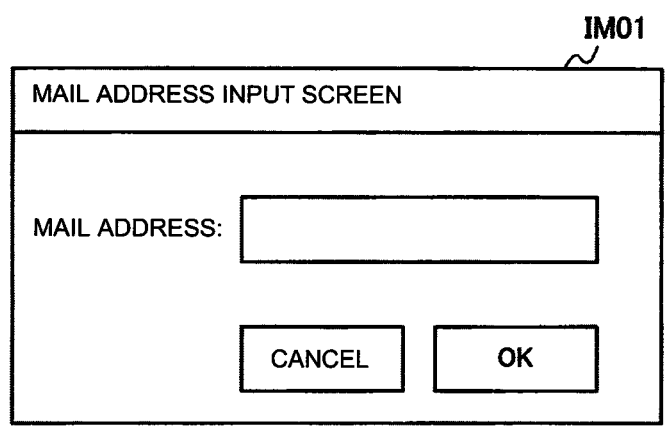
FIG. 3 is a schematic diagram illustrating an example of a mail address input screen in Embodiment 1.

Mail address input unit 121 receives input of a mail address which is an address of mobile terminal 110. For example, mail address input unit 121 receives input of the mail address from the user of mobile terminal 110 via display unit 129 and input unit 128. Specifically, mail address input unit 121 causes display unit 129 to display mail address input screen IM01 as illustrated in FIG. 3 by using screen data 113 stored in storage unit 111. Then, mail address input unit 121 receives the mail address inputted on mail address input screen IM01 by using input unit 128, and stores the mail address in storage unit 111. In this way, mail address 115 is stored in storage unit 111.

Mail address acquisition unit 122 acquires the mail address of mobile terminal 110. For example, mail address acquisition unit 122 acquires mail address 115 stored in storage unit 111.

Data adder unit 123 generates a print job (image formation job) by adding the user ID acquired by user ID acquisition unit 120 and mail address 115 acquired by mail address acquisition unit 122 to print data 114 generated by print data generator unit 119.

Figure 4:
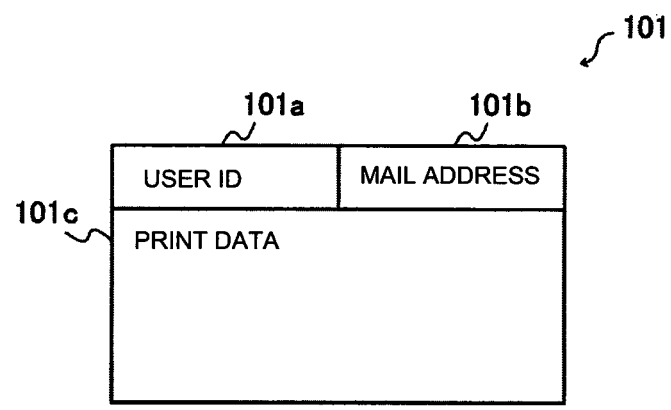
FIG. 4 is a schematic diagram illustrating an example of a print job in Embodiment 1.

FIG. 4 is a schematic diagram illustrating an example of a print job. As illustrated in FIG. 4, print job 101 includes user ID 101a, mail address 101b, and print data 101c.

Returning to the description of FIG. 2, print job output unit 124 sends the print job generated by data adder unit 123 to printer 140. For example, print job output unit 124 causes communication unit 130 to transmit the print job generated by data adder unit 123.

Receiver unit 126 receives electronic mails (e-mails). For example, receiver unit 126 receives an e-mail received by communication unit 130. Then, when input unit 128 receives input of a display instruction from the user of mobile terminal 110, receiver unit 126 causes display unit 129 to display the content of the received e-mail.

Input unit 128 receives input from the user.

Display unit 129 displays the screens.

Communication unit 130 performs communications with Internet 160. Here, communication unit 130 transmits and receives information to and from Internet 160 through wireless communications.

Mobile terminal 110 described hereinabove can be implemented, for example, by a computer including a CPU (Central Processing Unit), a RAM (Random Access Memory), an external storage device such as a ROM (Read Only Memory), an input device and a display device such as a touch panel, and a communication device for Internet connection.

For example, storage unit 111 can be implemented by the CPU using the RAM or the external storage device. Controller unit 117 can be implemented by the CPU loading a predetermined program stored in the external storage device onto the RAM and executing the loaded program. Input unit 128 can be implemented by the CPU using the input device. Display unit 129 can be implemented by the CPU using the display device. Communication unit 130 can be implemented by the CPU using the communication device. It should be noted, however, that mobile terminal 110 in Embodiment 1 is not limited to one implemented in software on a computer system. For example, mobile terminal 110 may be one implemented in hardware by an integrated logic IC such as ASICs (Application Specific Integrated Circuits) or FPGA (Field Programmable Gate Array), or may be one implemented in software by DSP (Digital Signal Processor) or the like.

FIG. 5 is a block diagram schematically illustrating a configuration of printer 140. Printer 140 includes storage unit 141, controller unit 145, print unit 151 as an image formation unit, and communication unit 152.

Storage unit 141 stores information necessary for processing in printer 140. For example, storage unit 141 stores print function restriction table 142, and determination-waiting print job file 143.

Print function restriction table 142 is print function restriction information (image formation function restriction information) indicating a condition under which printing is restricted for each user ID.

FIG. 6 is a schematic diagram illustrating an example of print function restriction table 142.

Print function restriction table 142 includes user ID column 142a, and restriction column for color printing availability 142b. User ID column 142a stores user IDs. Restriction column for color printing availability 142b stores color-printing availability information which indicates whether or not color printing is available to a user identified with each user ID stored in user ID column 142a. For example, if "available" is stored in restriction column for color printing availability 142b, the user identified with the user ID correspondingly stored in user ID column 142a is permitted to make color printing. On the other hand, if "unavailable" is stored in restriction column for color printing availability 142b, the user identified with the user ID correspondingly stored in user ID column 142a is not permitted to make color printing.

Returning the explanation of FIG. 5, determination-waiting print job file 143 is a file storing print job 101 which waits for controller unit 145 to make authentication.

Controller unit 145 controls processing in printer 140. Controller unit 145 includes receiver unit 146, authentication determination unit 147 as a determination unit, authentication result transmitter unit 148 as a notification information transmitter unit, and print processor unit 149 as an image formation processor unit.

Receiver unit 146 receives print job 101. For example, receiver unit 146 receives print job 101 received by communication unit 152. Then, receiver unit 146 acquires user ID 101a and mail address 101b from received print job 101, and stores received print job 101 as determination-waiting print job file 143 in storage unit 141.

Authentication determination unit 147 determines whether or not to impose restriction on processing of print job 101. For example, authentication determination unit 147 determines whether or not print data 101c contained in print job 101 is printable. Specifically, on the basis of user ID 101a and print data 101c contained in print job 101, authentication determination unit 147 refers to print function restriction table 142 stored in storage unit 141, and determines whether or not the print function to be used is restricted.

Authentication result transmitter unit 148 generates notification information concerning print job 101 and sends the generated notification information to the address contained in print job 101. For example, if authentication determination unit 147 determines that printing of a print job is unavailable (image formation is unavailable), authentication result transmitter unit 148 transmits the notification information indicating the determination result in the form of an e-mail from communication unit 152 to the mail address contained in the print job determined as printing-unavailable. For example, as presented in FIG. 7, authentication result transmitter unit 148 generates, as an e-mail, notification information indicating the resultant "printing-unavailable" status and the explanation of the print restriction (the reason why the printing is determined as unavailable), and transmits the e-mail from communication unit 152. In other words, the notification information in Embodiment 1 is information indicating the reason why restriction is imposed on the processing of print job 101, and the explanation of the restriction.

Returning to the description of FIG. 5, if authentication determination unit 147 determines that the printing is available, print processor unit 149 causes print unit 151 to make the printing based determination-waiting print job file 143 storing print job 101 determined as printing-available. On the other hand, if authentication determination unit 147 determines that the printing is unavailable, print processor unit 149 deletes, from storage unit 141, determination-waiting print job file 143 storing print job 101 determined as printing-unavailable.

Print unit 151 makes printing (image formation) on a medium such as paper.

Communication unit 152 performs communications with Internet 160.

Storage unit 141, controller unit 145 and communication unit 152 described above can be implemented by, for example, a CPU, a RAM, an external storage device such as a ROM, and a communication device for Internet connection.

For example, storage unit 141 can be implemented by the CPU using the RAM or the external storage device. Controller unit 145 can be implemented by the CPU loading a predetermined program stored in the external storage device onto the RAM and executing the loaded program. Communication unit 152 can be implemented by the CPU using the communication device.

(Description of Operation)

Figure 8:
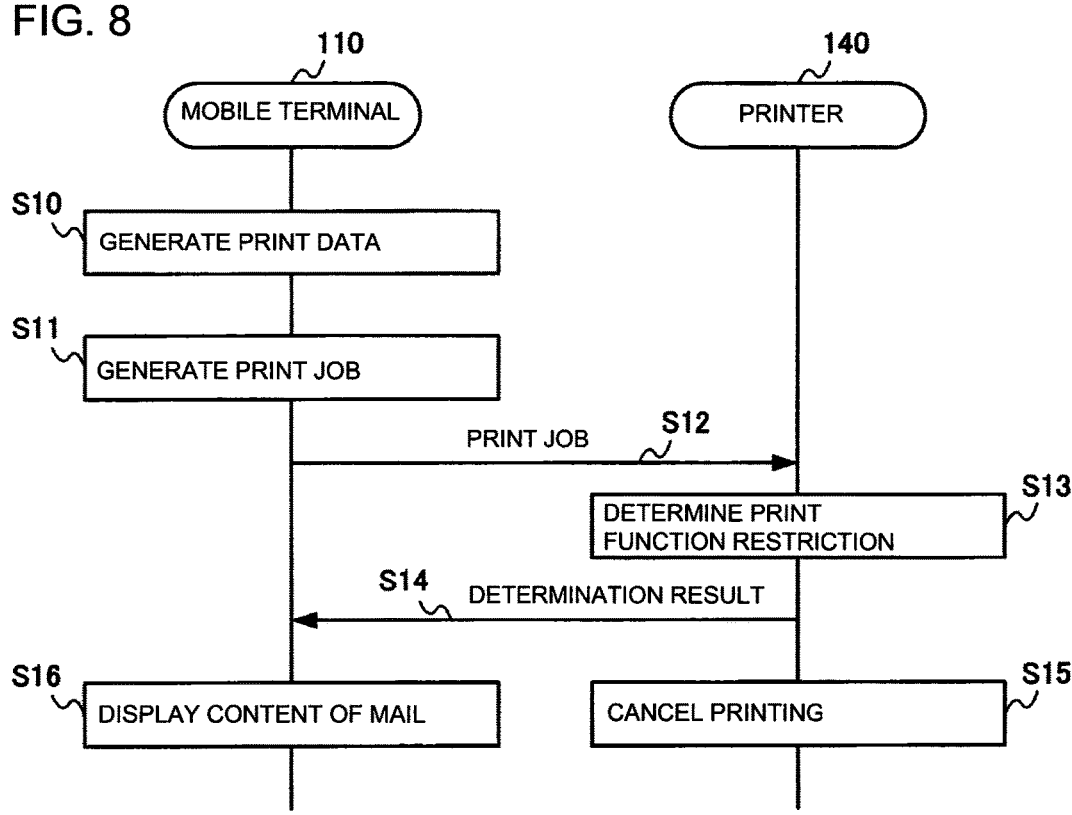
FIG. 8 is a sequence diagram illustrating processing in the information communication system according to Embodiment 1.

FIG. 8 is a sequence diagram illustrating processing in information communication system 100 according to Embodiment 1.

When input unit 128 of mobile terminal 110 receives an instruction from the user, printer driver unit 118 performs print processing. Firstly, print data generator unit 119 generates print data 114 (S10). Print data generator unit 119 stores generated print data 114 in storage unit 111.

Next, data adder unit 123 reads print data 114 from storage unit 111, and generates print job 101 by adding the user ID and mail address 115 to print data 114 (S11).

Print job output unit 124 sends generated print job 101 to printer 140 from communication unit 130 via Internet 160 (S12).

Receiver unit 146 of printer 140 receives print job 101 via communication unit 152, acquires user ID 101a and mail address 101b contained in received print job 101, and stores received print job 101 as determination-waiting print job file 143 in storage unit 141. Then, authentication determination unit 147 determines the print function restriction on the basis of the user ID 101a and print data 101c acquired from print job 101 (S13). Here, it is assumed that authentication determination unit 147 determines that the printing is unavailable.

Authentication result transmitter unit 148 generates an e-mail indicating the result of the determination made by authentication determination unit 147 (for example, the printing-unavailable status and the information of the print function restriction), and transmits the e-mail from communication unit 152 to mail address 101b acquired from print job 101 (S14).

Print processor unit 149 cancels the printing, and deletes determination-waiting print job file 143 determined as printing-unavailable from storage unit 141 (S15).

Meanwhile, receiver unit 126 of mobile terminal 110 receives the e-mail via communication unit 130, and causes display unit 129 to display the content of the e-mail in response to an instruction from the user (S16). Thus, the user of mobile terminal 110 can check the determination result of the print function restriction for the print job.

Figure 9:
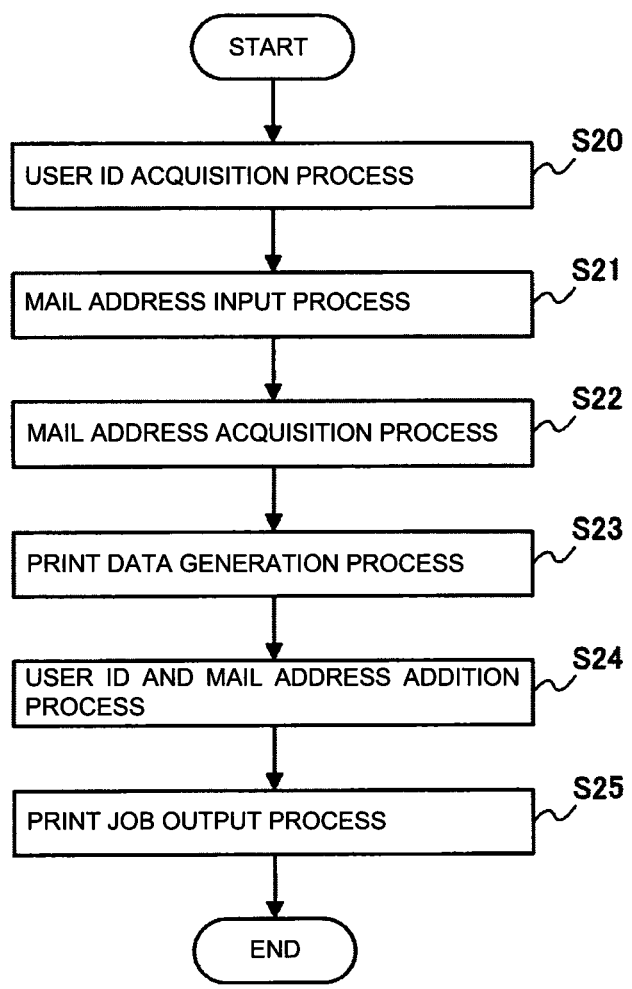
FIG. 9 is a flowchart illustrating processing in the mobile terminal in Embodiment 1.

FIG. 9 is a flowchart illustrating processing in mobile terminal 110.

The flowchart presented in FIG. 9 is started in response to an event where input unit 128 receives a print execution instruction from the user.

User ID acquisition unit 120 acquires the user ID of the user, who currently logs on, from log-on information 112 stored in storage unit 111 by using the API function of the OS (S20).

Mail address input unit 121 causes display unit 129 to display mail address input screen IM01 illustrated in FIG. 3 based on screen data 113 stored in storage unit 111, and receives input of the mail address from the user via input unit 128 (S21). Mail address input unit 121 stores the inputted mail address in storage unit 111.

Mail address acquisition unit 122 acquires mail address 115 inputted by the user on mail address input screen IM01 and stored in storage unit 111 (S22).

Print data generator unit 119 generates print data through a certain known process (S23). Print data generator unit 119 stores the generated print data in storage unit 111.

Data adder unit 123 reads print data 114 from storage unit 111, and generates print job 101 by adding the user ID acquired in step S20 and mail address 115 acquired in step S22 to print data 114 (S24).

Print job output unit 124 outputs print job 101 generated in step S24 to printer 140 from communication unit 130 via Internet 160 (S25).

Figure 10:
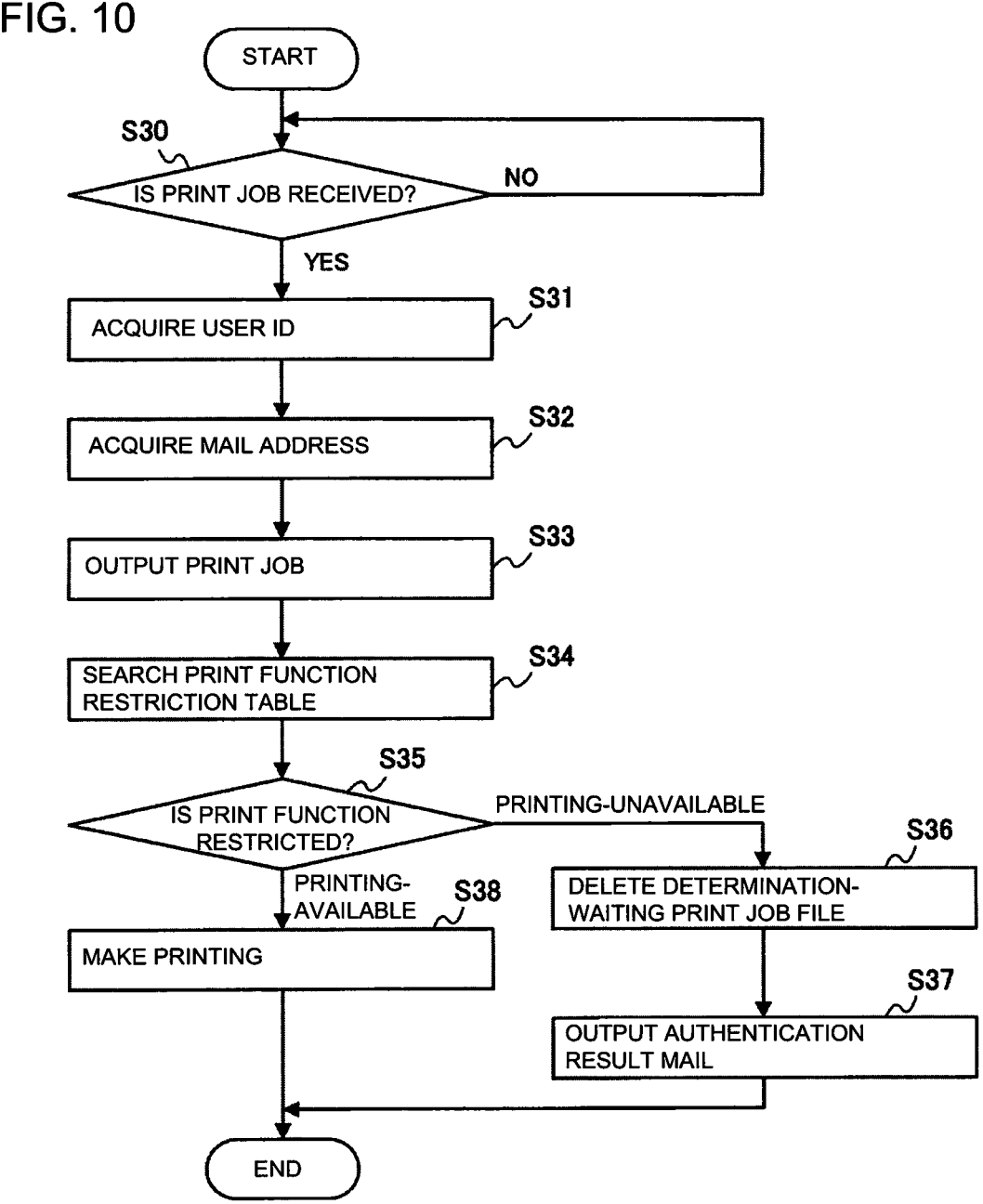
FIG. 10 is a flowchart illustrating processing in the printer in Embodiment 1.

FIG. 10 is a flowchart illustrating processing in printer 140.

Receiver unit 146 determines whether or not communication unit 152 receives print job 101 (S30). If print job 101 is received (Yes in S30), the processing proceeds to a user ID acquisition process in step S31.

In step S31, receiver unit 146 acquires user ID 101a from received print job 101.

Then, receiver unit 146 acquires mail address 101b from received print job 101 (S32).

Thereafter, receiver unit 146 stores received print job 101 as determination-waiting print job file 143 in storage unit 141 (S33).

Next, authentication determination unit 147 performs a search process on print function restriction table 142 (S34). Specifically, authentication determination unit 147 searches print function restriction table 142 presented in FIG. 6 by using user ID 101a acquired in step S31 as a key, and thereby acquires the information on the color-printing availability associated with user ID 101a.

Then, authentication determination unit 147 determines whether or not to restrict the printing on the basis of determination-waiting print job file 143 stored in step S33 and the color-printing availability information acquired in step S34 (S35). Here, if the print data contained in determination-waiting print job file 143 stored in step S33 is data for color printing, and if the color-printing availability information acquired in step S34 indicates that the color printing is not permitted, authentication determination unit 147 determines that the printing is restricted. In other cases, authentication determination unit 147 determines that the printing is not restricted. If the printing is determined as restricted (printing-unavailable), the processing proceeds to step S36. On the other hand, if the printing is determined as not restricted (printing-available), the processing proceeds to step S38.

In step S36, print processor unit 149 deletes determination-waiting print job file 143, for which the printing is determined as restricted in step S35, from storage unit 141.

Authentication result transmitter unit 148 generates an e-mail including text indicating the printing-unavailable status and the explanation of the restriction of the authentication result. Then, authentication result transmitter unit 148 outputs the generated e-mail from communication unit 152 to the mail address acquired in step S32 (S37). Here, the output process of the e-mail uses any known technique.

On the other hand, in step S38, print processor unit 149 causes print unit 151 to make printing by giving print unit 151 determination-waiting print job file 143 for which the printing is determined as not restricted in step S35.

As described above, according to Embodiment 1, a response from printer 140 is directly sent to mobile terminal 110 by using a communication scheme using a public telecommunication network. Thus, mobile terminal 110 does not have to respond to the software in the cloud or Internet environment through bidirectional communications, or the software of mobile terminal 110 does not have to analyze the status in the response from printer 140. For these reasons, printer 140 in an environment using a cloud technology or Internet technology is capable of notifying a user of an authentication result certainly. Here, the public telecommunication network used herein may be of any widely-used communication scheme such as e-mail, telephone, or facsimile.

Embodiment 2.

(Description of Configuration)

Figure 11:
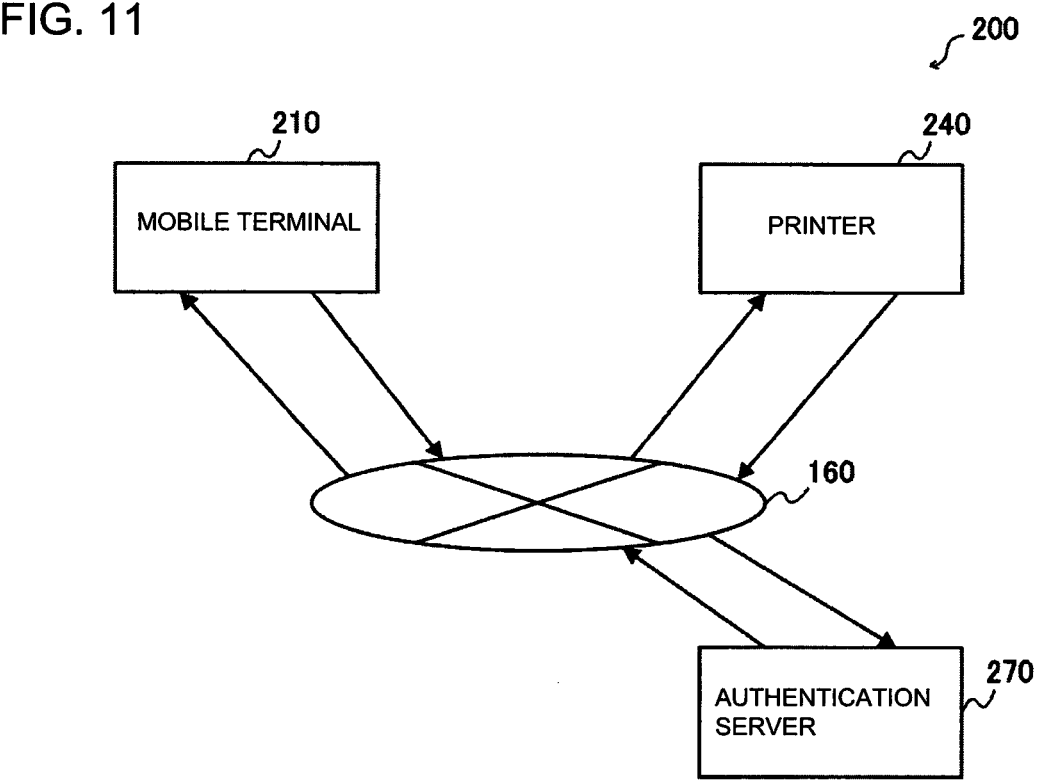
FIG. 11 is a schematic diagram of an information communication system according to Embodiment 2.

FIG. 11 is a schematic diagram of information communication system 200 according to Embodiment 2. Information communication system 200 includes mobile terminal 210, printer 240, and authentication server 270 as a determination server. Mobile terminal 210, printer 240 and authentication server 270 are connected to Internet 160.

FIG. 12 is a block diagram schematically illustrating a configuration of mobile terminal 210. Mobile terminal 210 includes storage unit 211, controller unit 217, input unit 128, display unit 129, and communication unit 130. Mobile terminal 210 in Embodiment 2 is different from mobile terminal 110 in Embodiment 1 in terms of storage unit 211 and controller unit 217.

Storage unit 211 stores information necessary for processing in mobile terminal 210. For example, storage unit 211 stores log-on information 112, screen data 113, print data 114, and address table 216. Storage unit 211 in Embodiment 2 is different from storage unit 111 in Embodiment 1 in that storage unit 211 stores address table 216 instead of storing mail address 115. Address table 216 is address identification information indicating a mail address for each user ID.

FIG. 13 is a schematic diagram illustrating an example of address table 216.

Address table 216 includes user ID column 216a, and mail address column 216b. User ID column 216a stores user IDs. Mail address column 216b stores the mail addresses of users identified with the user IDs in user ID column 216a. For example, controller unit 217 causes display unit 129 to display mail address input screen IM01 illustrated in FIG. 3, a user inputs the mail address via input unit 128, and the inputted mail address is stored in mail address column 216b. Note that a user ID contained in log-on information 112 used in the input event of the mail address is stored in user ID column 216a.

Returning to the description of FIG. 12, controller unit 217 controls processing in mobile terminal 210.

Controller unit 217 includes printer driver unit 218, and receiver unit 126. Controller unit 217 in Embodiment 2 is different from controller unit 117 in Embodiment 1 in terms of printer driver unit 218.

Printer driver unit 218 generates a print job based on which printer 240 is to make printing, and sends the print job to printer 240. Printer driver unit 218 includes print data generator unit 119, user ID acquisition unit 120, mail address acquisition unit 222, data adder unit 123, and print job output unit 124. Printer driver unit 218 in Embodiment 2 is different from printer driver unit 118 in Embodiment 1 in that printer driver unit 218 does not include mail address input unit 121 and performs different processing in mail address acquisition unit 222.

Mail address acquisition unit 222 acquires the mail address of the user of mobile terminal 210. For example, mail address acquisition unit 222 acquires the mail address associated with the user ID acquired by user ID acquisition unit 120 from address table 216 stored in storage unit 211.

Figure 14:
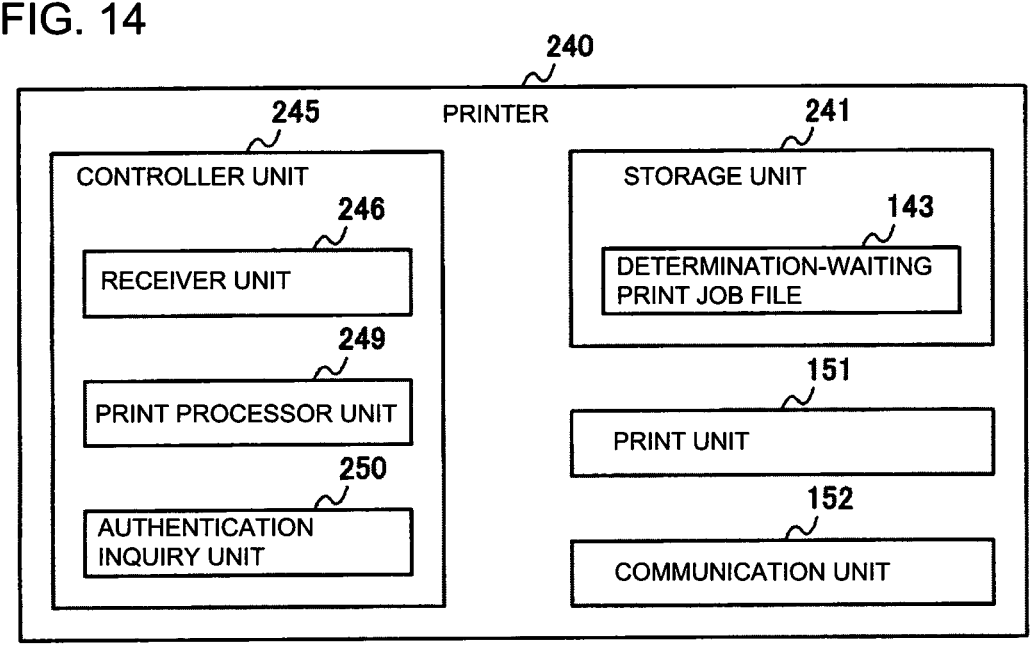
FIG. 14 is a block diagram schematically illustrating a configuration of a printer in Embodiment 2.

FIG. 14 is a block diagram schematically illustrating a configuration of printer 240. Printer 240 includes storage unit 241, controller unit 245, print unit 151, and communication unit 152.

Storage unit 241 stores information necessary for processing in printer 240. For example, storage unit 241 stores determination-waiting print job file 143. Storage unit 241 in Embodiment 2 is different from storage unit 141 in Embodiment 1 in that storage unit 241 does not store print function restriction table 142.

Controller unit 245 controls processing in printer 240. Controller unit 245 includes receiver unit 246, print processor unit 249, and authentication inquiry unit 250 as an inquiry unit. Controller unit 245 in Embodiment 2 is different from controller unit 145 in Embodiment 1 in that controller unit 245 includes authentication inquiry unit 250 in place of authentication determination unit 147 and authentication result transmitter unit 148, and performs different processing in receiver unit 246 and print processor unit 249.

Receiver unit 246 performs not only the same processing as in receiver unit 146 in Embodiment 1, but also processing of receiving an authentication result command as response information sent from authentication server 270. For example, receiver unit 246 receives the authentication result command received by communication unit 152. Then, receiver unit 246 gives the received authentication result command to print processor unit 249.

In order to inquire of authentication server 270 about print function restriction for the user identified with the user ID, authentication inquiry unit 250 generates an authentication inquiry command as inquiry information, and sends the generated authentication inquiry command to authentication server 270. For example, authentication inquiry unit 250 causes communication unit 152 to transmit the generated authentication inquiry command. Here, the authentication inquiry command contains user ID 101a and mail address 101b contained in print job 101 received by receiver unit 246. Moreover, the authentication inquiry command contains determination reference information which is necessary to determine whether or not to impose restriction on processing of a print job. The determination reference information used herein is color information indicating whether or not print data 101c contained in print job 101 received by receiver unit 246 is data for color printing.

Figure 15:
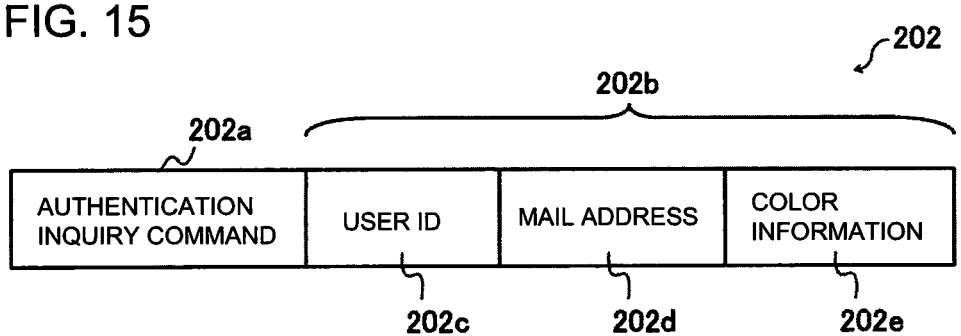
FIG. 15 is a schematic diagram illustrating an example of an authentication inquiry command in Embodiment 2.

FIG. 15 is a schematic diagram illustrating an example of an authentication inquiry command. In authentication inquiry command 202, command section 202a stores a command for making an inquiry about an authentication, and data section 202b stores user ID 202c, mail address 202d and color information 202e.

Returning to the description of FIG. 14, print processor unit 249 receives an authentication result command from receiver unit 246. If the authentication result command indicates that the restriction is not imposed on the processing of the print job, print processor unit 249 causes print unit 151 to make the printing based on determination-waiting print job file 143 for which the determination is made. On the other hand, if the authentication result command indicates that the restriction is imposed on the processing of the print job, print processor unit 249 deletes determination-waiting print job file 143, for which the determination is made, from storage unit 241.

Figure 16:
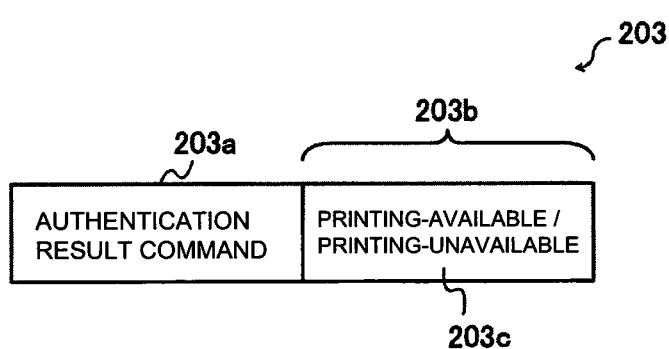
FIG. 16 is a schematic diagram illustrating an example of an authentication result command in Embodiment 2.

FIG. 16 is a schematic diagram illustrating an example of an authentication result command. In authentication result command 203, command section 203a stores a command for notifying an authentication result, and data section 203b stores information indicating whether or not the restriction is imposed on the processing of the print job, specifically, information (printing availability information) 203c indicting that the printing is available or unavailable. Here, data section 203b may contain at least any one of the user ID and the mail address contained in authentication inquiry command 202 for which the authentication is made.

Figure 17:
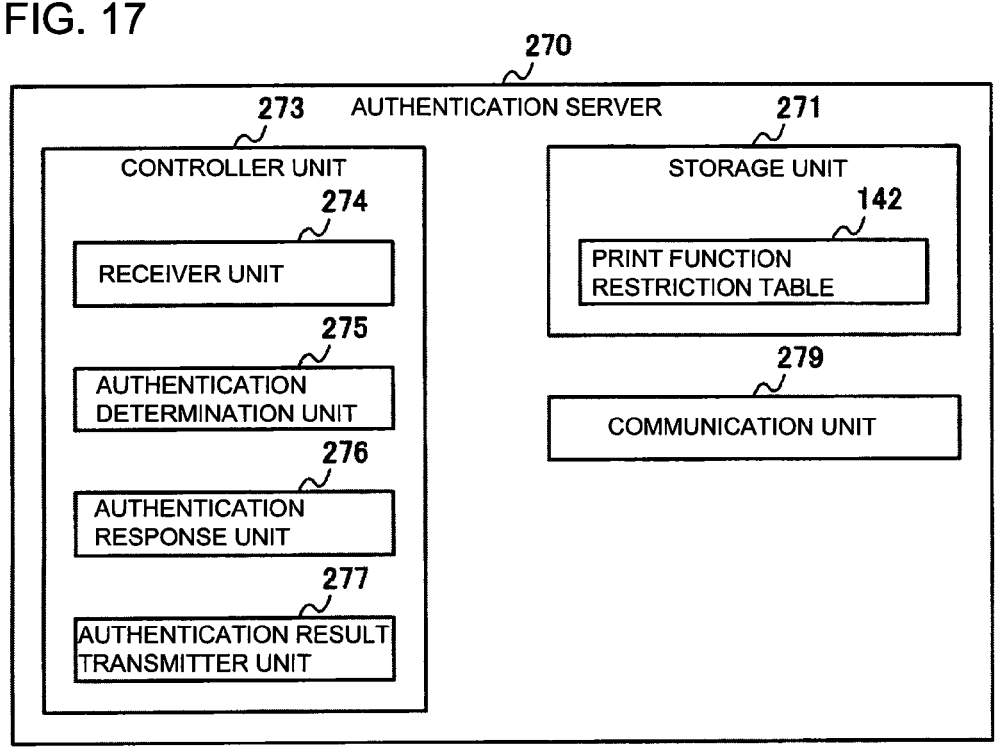
FIG. 17 is a block diagram schematically illustrating a configuration of an authentication server in Embodiment 2.

FIG. 17 is a block diagram schematically illustrating a configuration of authentication server 270. Authentication server 270 includes storage unit 271, controller unit 273, and communication unit 279.

Storage unit 271 stores information necessary for processing in authentication server 270. For example, storage unit 271 stores print function restriction table 142. Print function restriction table 142 is print function restriction information indicating a condition under which printing is restricted for each user ID and is the same as or similar to that presented in FIG. 6.

Controller unit 273 controls processing in authentication server 270. Controller unit 273 includes receiver unit 274, authentication determination unit 275 as a determination unit, authentication response unit 276 as a response unit, and authentication result transmitter unit 277 as a result transmitter unit.

Receiver unit 274 receives authentication inquiry command 202. For example, receiver unit 274 receives authentication inquiry command 202 received by communication unit 279. Then, receiver unit 274 acquires user ID 202c, mail address 202d and color information 202e from received authentication inquiry command 202.

Authentication determination unit 275 determines whether or not to impose restriction on the processing of print job 101. For example, authentication determination unit 275 determines whether or not print data 101c contained in print job 101 is printable. Specifically, on the basis of user ID 202c and color information 202e acquired by receiver unit 274, authentication determination unit 275 refers to print function restriction table 142 stored in storage unit 271, and determines whether or not the print function to be used is restricted.

Authentication response unit 276 sends printer 240 response information indicating the result of determination made by authentication determination unit 275. For example, authentication response unit 276 generates authentication result command 203 according to the result of the authentication made by authentication determination unit 275. Then, authentication response unit 276 causes communication unit 279 to transmit generated authentication result command 203 to printer 240.

Authentication result transmitter unit 277 generates notification information concerning print job 101 corresponding to authentication inquiry command 202 received from printer 240, and sends the generated notification information to the address contained in this authentication inquiry command 202. For example, if authentication determination unit 275 determines that the printing is unavailable, authentication result transmitter unit 277 sends, from communication unit 279, information on the determination result in the form of an e-mail from communication unit 279 to the destination address set to the mail address acquired by receiver unit 274. For example, authentication result transmitter unit 277 generates an e-mail containing information indicating the resultant printing unavailable status and the explanation of the print restriction as presented in FIG. 7. Then, authentication result transmitter unit 277 causes communication unit 279 to transmit the generated e-mail.

Communication unit 279 performs communications with Internet 160.

Authentication server 270 described above can be implemented, for example, by a computer including a CPU, a RAM, external storage devices such as a ROM and an HDD (Hard Disk Drive), and a communication device for Internet connection. For example, storage unit 271 can be implemented by the CPU using any of the RAM and the external storage devices, controller unit 273 can be implemented by the CPU loading a predetermined program stored in any of the external storage devices onto the RAM and executing the loaded program, and communication unit 279 can be implemented by the CPU using the communication device.

(Description of Operation)

Figure 18:
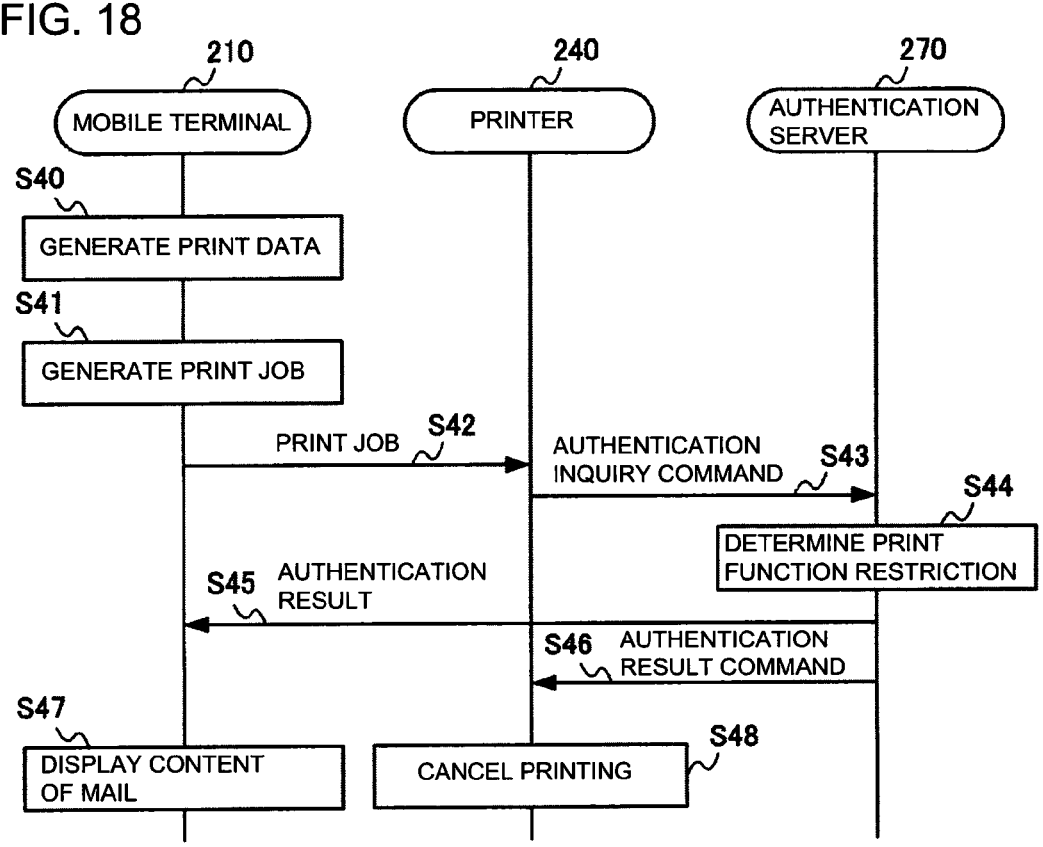
FIG. 18 is a sequence diagram illustrating processing in the information communication system according to Embodiment 2.

FIG. 18 is a sequence diagram illustrating processing in information communication system 200 according to Embodiment 2.

When input unit 128 of mobile terminal 210 receives an instruction from the user, printer driver unit 218 performs print processing. Firstly, print data generator unit 119 generates print data (S40). Print data generator unit 119 stores the generated print data in storage unit 211. Next, data adder unit 123 reads print data 114 from storage unit 211 and generates a print job by adding the user ID and the mail address to read print data 114 (S41). Print job output unit 124 sends the generated print job to printer 240 from communication unit 130 via Internet 160 (S42).

Receiver unit 246 of printer 240 receives the print job via communication unit 152, acquires the user ID and the mail address contained in the received print job, and stores the received print job as determination-waiting print job file 143 in storage unit 141. Thereafter, authentication inquiry unit 250 analyses the print data contained in the print job to acquire the color information, generates authentication inquiry command 202 by using the color information as well as the user ID and the mail address acquired by the receiver unit 246, and sends authentication inquiry command 202 to authentication server 270 via communication unit 152 (S43).

Receiver unit 274 of authentication server 270 receives authentication inquiry command 202 via communication unit 279, and acquires user ID 202c, mail address 202d and color information 202e from received authentication inquiry command 202. Then, authentication determination unit 275 determines print function restriction on the basis of user ID 202c and color information 202e acquired by receiver unit 274 (S44). Here, it is assumed that authentication determination unit 275 determines that the printing is unavailable.

Authentication result transmitter unit 277 generates an e-mail indicating the result of the determination made by authentication determination unit 275 (for example, the printing unavailability status and the explanation of the print function restriction), and transmits the e-mail to the mail address acquired by receiver unit 274 from communication unit 279 (S45).

Thereafter, authentication response unit 276 generates authentication result command 203 based on the result of determination made by the authentication determination unit 275, and transmits authentication result command 203 to printer 240 from communication unit 279 (S46). Here, it is assumed that authentication result command 203 is set as printing-unavailable.

Receiver unit 126 of mobile terminal 210 receives the e-mail via communication unit 130, and causes display unit 129 to display the content of the e-mail in response to an instruction from the user (S47). Thus, the user of mobile terminal 210 can check the determination result of the print function restriction for the print job.

In addition, receiver unit 246 of printer 240 receives authentication result command 203 via communication unit 152. Since authentication result command 203 received herein is set as printing-unavailable, print processor unit 249 cancels the printing, and deletes determination-waiting print job file 143 determined as printing-unavailable from storage unit 241 (S48).

Figure 19:
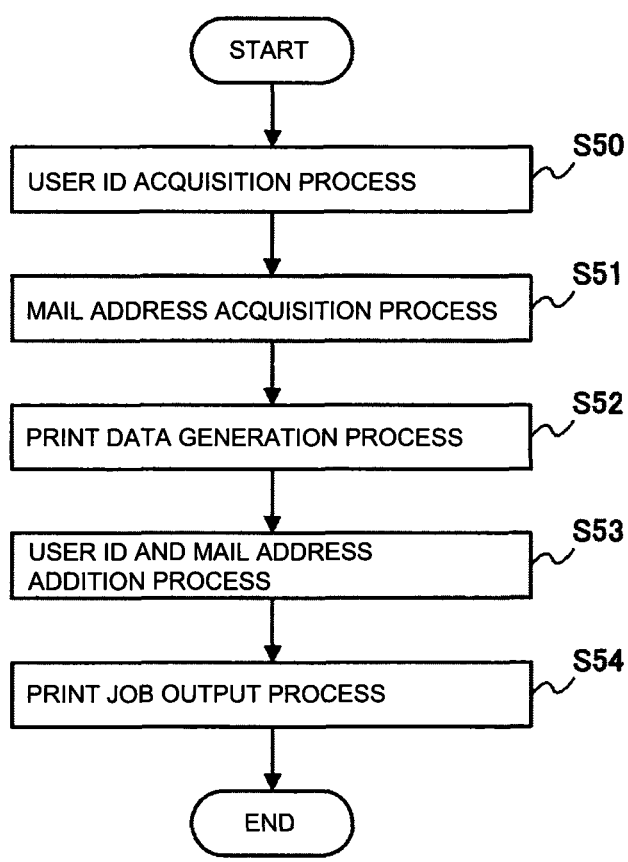
FIG. 19 is a flowchart illustrating processing in the mobile terminal in Embodiment 2.

FIG. 19 is a flowchart illustrating processing in mobile terminal 210. The flowchart presented in FIG. 19 is started in response to an event where input unit 128 receives a print execution instruction from the user.

User ID acquisition unit 120 acquires the user ID of the user, who currently logs on, from log-on information 112 stored in storage unit 211 by using the API function of the OS (S50).

Mail address acquisition unit 222 searches address table 216 stored in storage unit 211 by using as a key the user ID acquired by user ID acquisition unit 120, and thereby acquires the mail address associated with the user ID (S51).

Print data generator unit 119 generates print data through a certain known process (S52). Print data generator unit 119 stores the generated print data in storage unit 211.

Data adder unit 123 reads print data 114 from storage unit 211, and generates a print job by adding the user ID acquired in step S50 and the mail address acquired in step S51 to print data 114 (S53).

Print job output unit 124 outputs the print job generated in step S53 to printer 240 from communication unit 130 via Internet 160 (S54).

Figure 20:
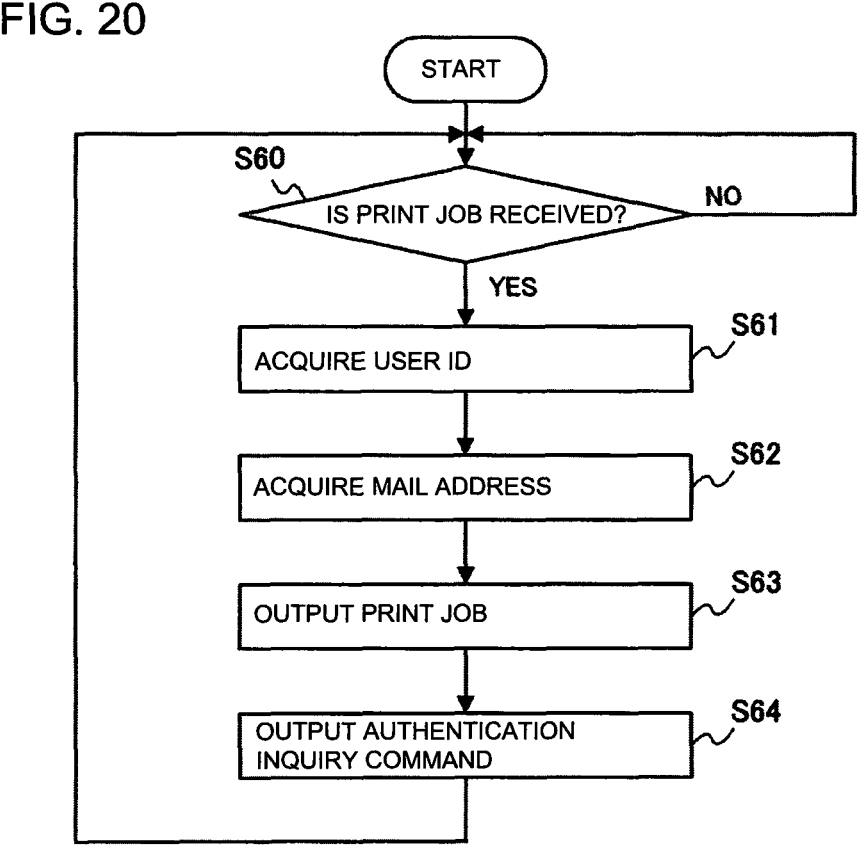
FIG. 20 is a flowchart illustrating processing that the printer performs when receiving a print job in Embodiment 2.

FIG. 20 is a flowchart illustrating processing that printer 240 performs when receiving a print job.

Receiver unit 246 determines whether or not communication unit 152 receives a print job (S60). If a print job is received (Yes in S60), the processing proceeds to a user ID acquisition process in step S61.

In step S61, receiver unit 246 acquires the user ID from the received print job.

Then, receiver unit 246 acquires the mail address from the received print job (S62).

Thereafter, receiver unit 246 stores the received print job as determination-waiting print job file 143 in storage unit 241 (S63).

Next, authentication inquiry unit 250 identifies the color information by determining whether or not the print data contained in determination-waiting print job file 143 stored in step S63 is data for color printing. Then, authentication inquiry unit 250 generates authentication inquiry command 202 containing the user ID acquired in step S61, the mail address acquired in step S62, and the identified color information, and outputs authentication inquiry command 202 from communication unit 152 to authentication server 270 (S64).

Figure 21:
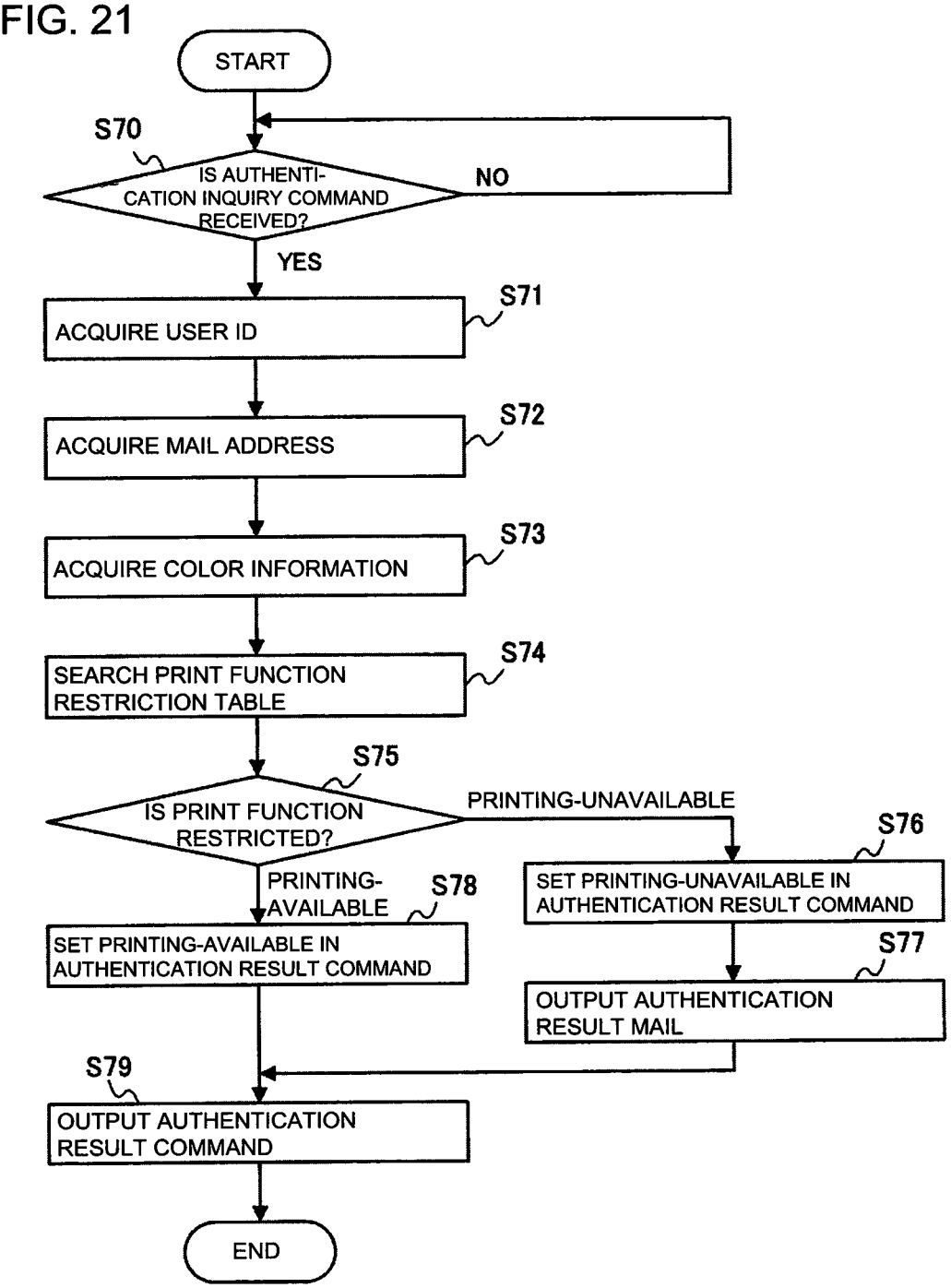
FIG. 21 is a flowchart illustrating processing in the authentication server in Embodiment 2.

FIG. 21 is a flowchart illustrating processing in authentication server 270.

Receiver unit 274 determines whether or not communication unit 279 receives authentication inquiry command 202 (S70). If authentication inquiry command 202 is received (YES in S70), the processing proceeds to a user ID acquisition process in step S71.

In step S71, receiver unit 274 acquires user ID 202c from received authentication inquiry command 202.

Then, receiver unit 274 acquires mail address 202d from received authentication inquiry command 202 (S72).

Moreover, receiver unit 274 acquires color information 202e from received authentication inquiry command 202 (S73).

Subsequently, authentication determination unit 275 performs a search process on print function restriction table 142 (S74). Specifically, authentication determination unit 275 searches print function restriction table 142 presented in FIG. 6 by using the user ID acquired in step S71 as a key, and thereby acquires the color-printing availability information associated with the user ID.

Then, authentication determination unit 275 determines whether or not to restrict the printing (S75), based on color information 202e acquired in step S73, and the color-printing availability information acquired in step S74. Here, authentication determination unit 275 determines that the printing is restricted if color information 202e acquired in step S73 indicates that the color printing is requested and the color-printing availability information acquired in step S74 indicates that the color printing is not permitted. In other cases, authentication determination unit 275 determines that the printing is not restricted. The processing proceeds to step S76 if the printing is determined as restricted (printing-unavailable), or proceeds to step S78 if the printing is determined as not restricted (printing-available).

In step S76, authentication response unit 276 generates authentication result command 203 set as printing-unavailable.

In addition, authentication result transmitter unit 277 generates an e-mail containing text indicating the printing unavailability status and the explanation of the restriction of the authentication result. Then, authentication result transmitter unit 277 outputs the generated e-mail from communication unit 279 to the destination address set to the mail address acquired in step S72 (S77). Here, any known technique may be used as the output process of the e-mail.

On the other hand, in step S78, authentication response unit 276 generates authentication result command 203 set as printing-available.

Then, authentication response unit 276 outputs authentication result command 203 generated in step S76 or S78 to printer 240 via communication unit 279 (S79).

Figure 22:
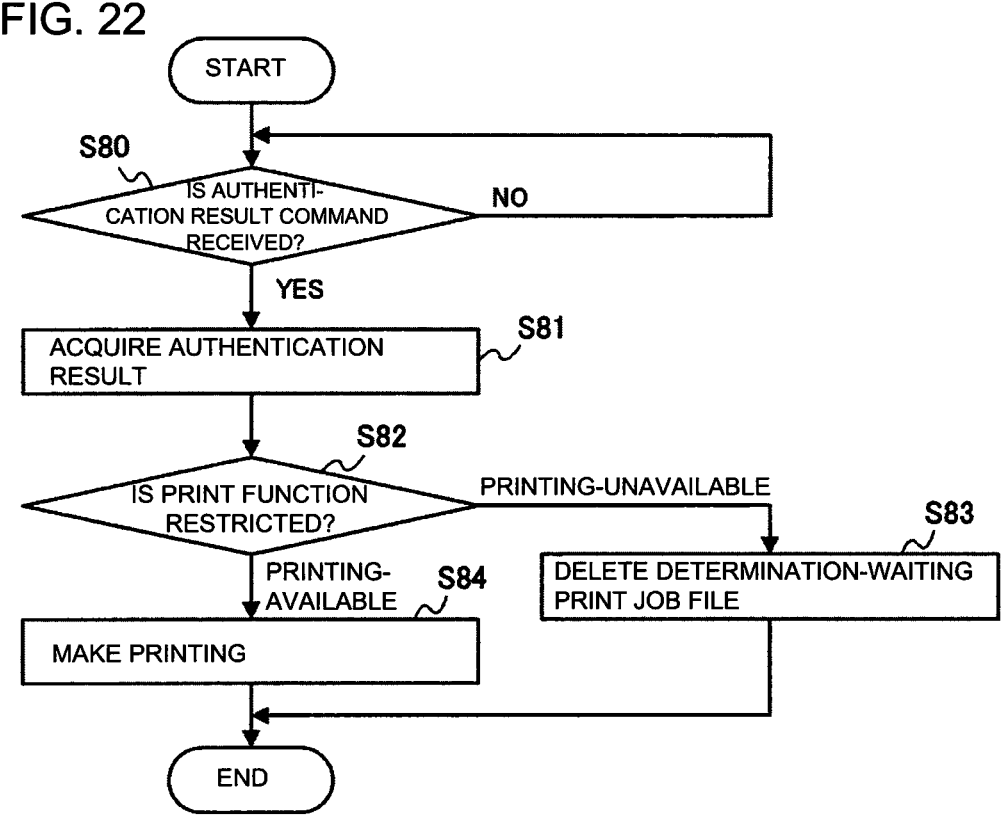
FIG. 22 is a flowchart illustrating processing that the printer performs when receiving an authentication result command in Embodiment 2.

FIG. 22 is a flowchart illustrating processing that printer 240 performs when receiving authentication result command 203.

Receiver unit 246 determines whether or not communication unit 152 receives authentication result command 203 (S80). If authentication result command 203 is received (Yes in S80), the processing proceeds to an authentication result acquisition process in step S81.

In step S81, receiver unit 246 acquires printing availability information 203c contained in received authentication result command 203.

Print processor unit 249 checks whether printing availability information 203c acquired by receiver unit 246 indicates that the printing is available or unavailable (S82). The processing proceeds to step S83 if it indicates that the printing is unavailable, and proceeds to step S84 if it indicates that the printing is available.

In step S83, print processor unit 249 deletes determination-waiting print job file 143 determined as printing-unavailable in step S82 from storage unit 241.

On the other hand, in step S84, print processor unit 249 gives determination-waiting print job file 143 determined as printing-available to print unit 151 and thereby causes print unit 151 to make the printing.

According to Embodiment 2, authentication server 270 performs the authentication determination process and the authentication result transmission process. Thus, the processing load on printer 240 can be reduced.

Embodiments 1 and 2 are described for the case where printing is made via Internet 160. It should be noted, however, that Embodiments 1 and 2 are applicable to any communication method that does not support bidirectional communications.

In Embodiment 1 and 2, the status of printer 140/240 is notified to the user via an e-mail. However, in addition to the status, any other information held by printer 140/240 may be notified to the user via an e-mail. For example, MENU information set in printer 140/240 may be notified to the user via an e-mail.

In Embodiment 1 described above, by way of a non-limiting example, mobile terminal 110 receives the input of the mail address as presented in step S21 in FIG. 9. In another example, a step like step S21 may be omitted if the mail address is stored in address table 216 in storage unit 111 as in Embodiment 2.

Figure 23:
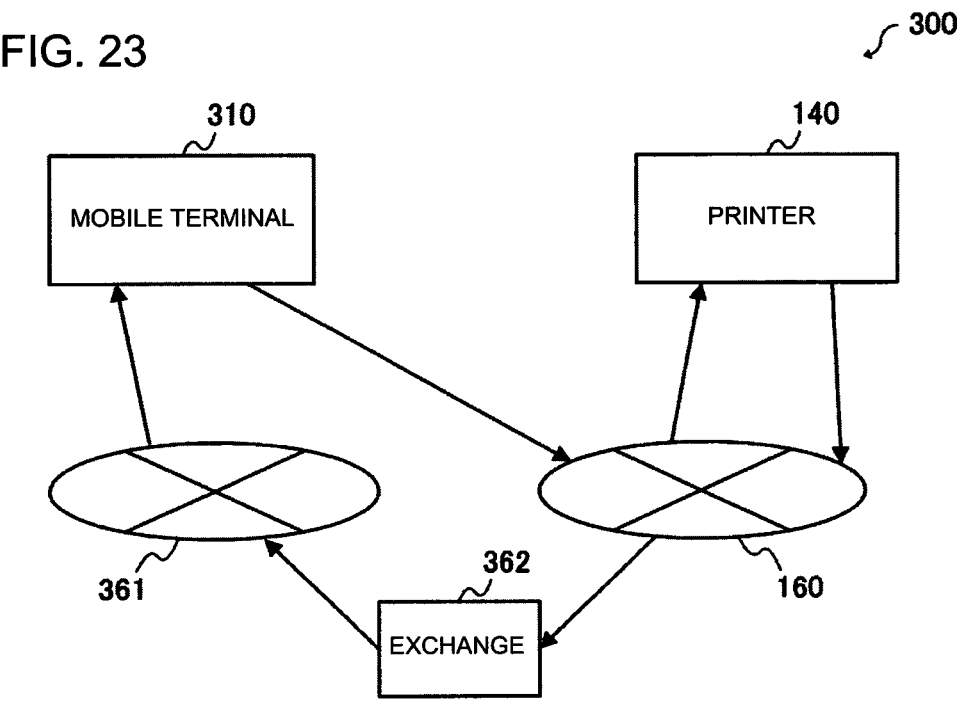
FIG. 23 is a schematic diagram illustrating a first modified example of the information communication system.

In Embodiment 1, by way of a non-limiting example, mobile terminal 110 is configured to receive an e-mail from Internet 160. In another example, information communication system 300 is configured as illustrated in FIG. 23. This configuration allows mobile terminal 310 to receive e-mails from mobile telephone network 361 as a public telecommunication network.

Figure 24:
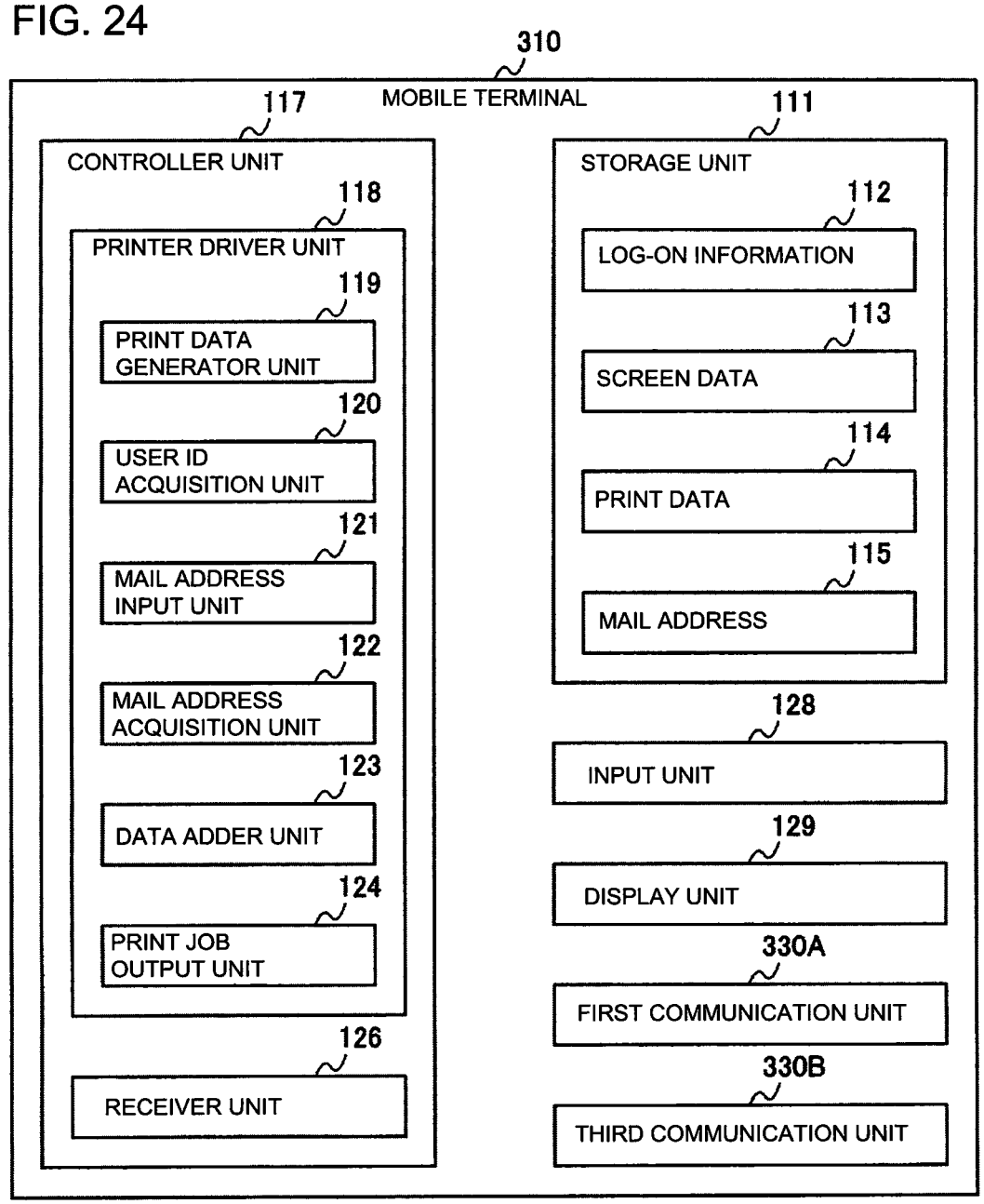
FIG. 24 is a block diagram schematically illustrating a configuration of a mobile terminal in the first modified example of the information communication system.

As illustrated in FIG. 23, information communication system 300 includes mobile terminal 310 and printer 140. Mobile terminal 310 and printer 140 are connected to Internet 160, and mobile terminal 310 is also connected to mobile telephone network 361. In this case, as illustrated in FIG. 24, mobile terminal 310 includes first communication unit 330A configured to establish connection to Internet 160, and third communication unit 330B configured to establish connection to mobile telephone network 361. With this configuration, an e-mail outputted to Internet 160 from printer 140 is converted from a format for Internet 160 to a format for mobile telephone network 361 by exchange 362, and then is sent to mobile terminal 310 from mobile telephone network 361. Receiver unit 126 acquires the e-mail via third communication unit 330B. First communication unit 330A and third communication unit 330B transmit and receive information through wireless communications.

Similarly, also in Embodiment 2, mobile terminal 210 may include a first communication unit configured to establish connection to Internet 160 and a third communication unit configured to establish connection to a mobile telephone network, and receive an e-mail from the mobile telephone network.

Figure 25:
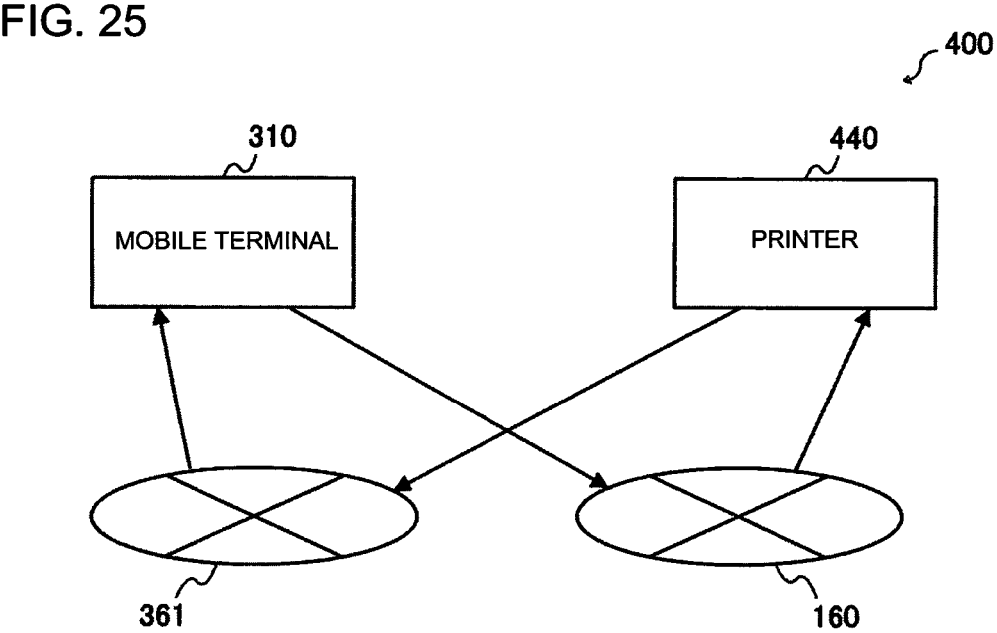
FIG. 25 is a schematic diagram of a second modified example of the information communication system.

In addition, as illustrated in FIG. 25, information communication system 400 may be configured such that both mobile terminal 310 and printer 440 are connected to both Internet 160 and mobile telephone network 361. In this case, printer 440 transmits an e-mail to mobile telephone network 361, and mobile terminal 310 receives the e-mail from mobile telephone network 361.

Figure 26:
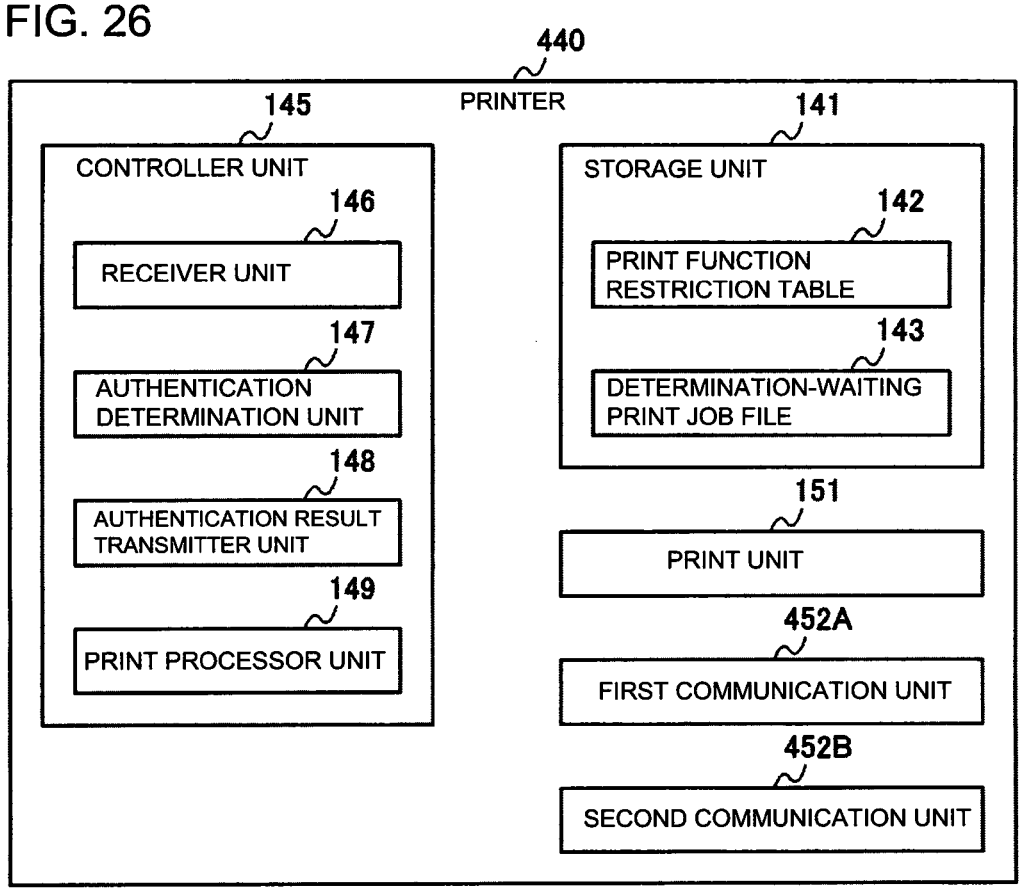
FIG. 26 is a block diagram schematically illustrating a configuration of a printer in the second modified example of the information communication system.

In this case, as illustrated in FIG. 26, printer 440 includes first communication unit 452A configured to establish connection to Internet 160, and second communication unit 452B configured to establish connection to mobile telephone network 361.

Further, also in Embodiment 2, authentication server 270 may include a first communication unit configured to establish connection to Internet 160, and a second communication unit configured to establish connection to the mobile telephone network, and transmit an e-mail to the mobile telephone network.

In Embodiment 2, by way of a non-limiting example, authentication inquiry command 202 and authentication result command 203 are transmitted and received via Internet 160. In another example, printer 240 and authentication server 270 may be provided with dedicated interface units, respectively, and may be directly connected to each other. Instead, printer 240 and authentication server 270 may be connected to a LAN or the like, which is a network other than Internet 160, and may transmit and receive these commands via this network.

Figure 27:
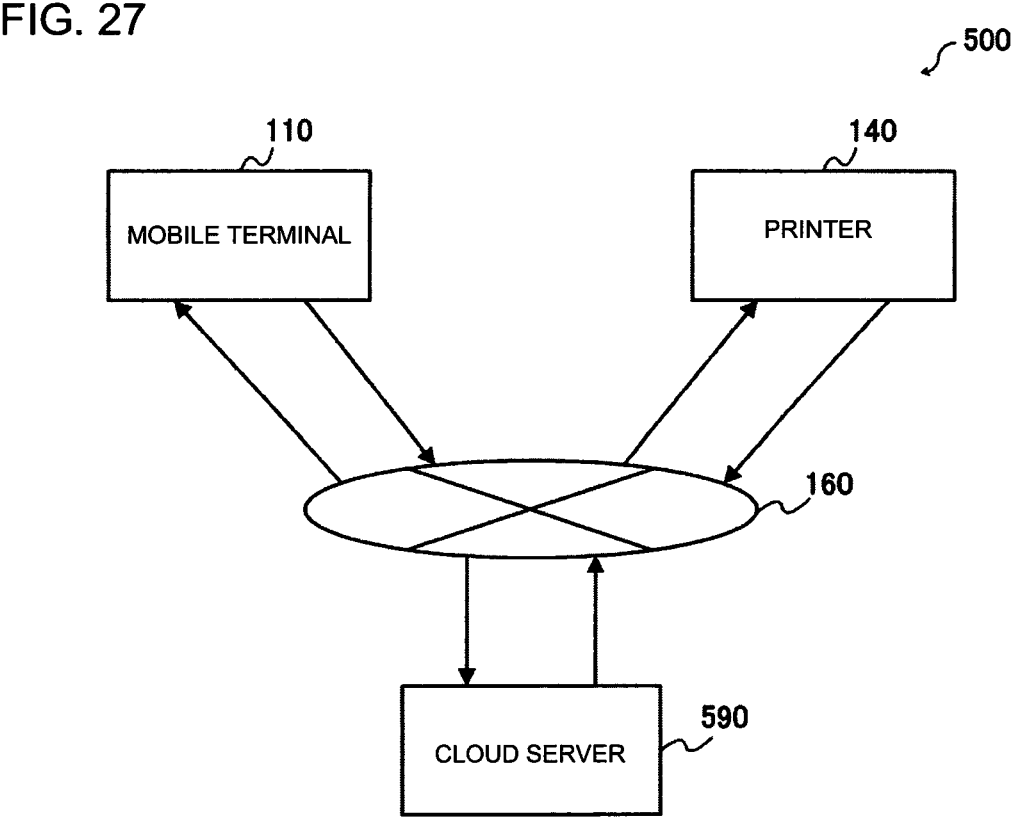
FIG. 27 is a schematic diagram of a third modified example of the information communication system.

Moreover, as in information communication system 500 illustrated in FIG. 27, cloud server 590 may be connected to Internet 160. In this case, print job output unit 124 of mobile terminal 110 causes communication unit 130 to transmit a print job to cloud server 590. Then, cloud server 590 forwards the received print job to printer 140. Then, receiver unit 146 of printer 140 receives the print job received by communication unit 152.

Figure 28:
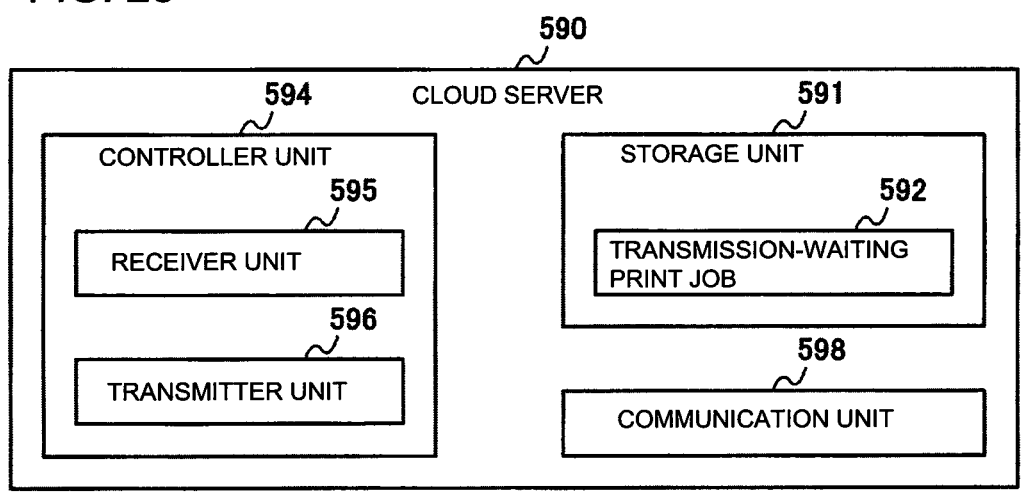
FIG. 28 is a block diagram schematically illustrating a configuration of a cloud server in the third modified example of the information communication system.

FIG. 28 is a block diagram schematically illustrating a configuration of cloud server 590. Cloud server 590 includes storage unit 591, controller unit 594, and communication unit 598.

Storage unit 591 stores information necessary for processing in cloud server 590. For example, storage unit 591 stores a print job received by communication unit 598 as transmission-waiting print job 592.

Controller unit 594 controls processing in cloud server 590. Controller unit 594 includes receiver unit 595 and transmitter unit 596.

Receiver unit 595 receives a print job via communication unit 598, and stores the received print job as transmission-waiting print job 592 in storage unit 591.

Transmitter unit 596 sends transmission-waiting print job 592 stored in storage unit 591 to printer 140 via communication unit 598.

Here, transmitter unit 596 sends transmission-waiting print job 592 at predetermined timing. For example, transmitter unit 596 checks the status of communications with printer 140 by using PING and/or the like, and sends transmission-waiting print job 592 when determining that the communications with printer 140 are possible. Instead, transmitter unit 596 may send transmission-waiting print jobs 592 on a regular basis. Moreover, when the data amount or the number of transmission-waiting print jobs 592 stored in storage unit 591 reaches a predetermined threshold, transmitter unit 596 may send transmission-waiting print jobs 592.

Communication unit 598 performs communications with Internet 160.

Cloud server 590 described above can be implemented, for example, by a computer including a CPU, a RAM, external storage devices such as a ROM and an HDD, and a communication device for Internet connection.

For example, storage unit 591 can be implemented by the CPU using any of the RAM and the external storage devices, controller unit 594 can be implemented by the CPU loading a predetermined program stored in any of the external storage devices onto the RAM and executing the loaded program, and communication unit 598 can be implemented by the CPU using the communication device.

Also in Embodiment 2, cloud server 590 may be connected to Internet 160, and the same processing as that described above can be executed.

In Embodiments 1 and 2 described above, whether or not the printing is available is determined based on print function restriction table 142 presented in FIG. 6. To be more specific, the availability for color printing is determined in advance for each user, and whether printing for a print job is available is determined based on the predetermined availability for color printing. However, in Embodiments 1 and 2, any other conditions may be employed to determine whether or not printing is available. For example, the print function restriction table may further store, in advance, at least one of conditions including the number of sheets to be printed, the cumulative number of printed sheets, a sheet size, and a print time, and whether or not printing for a print job is available may be determined based on whether or not the print job satisfies the condition.

In Embodiment 2 described above, by way of a non-limiting example, printer 240 sends authentication inquiry command 202 to authentication server 270. In another example, printer 240 may send a print job instead.

Further, in Embodiment 2, authentication server 270 sends an e-mail to mobile terminal 210 by way of a non-limiting example. In another example, printer 240 may generate an e-mail based on authentication result command 203 received from authentication server 270, and send the e-mail to mobile terminal 210.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. An image formation system comprising an external apparatus, a cloud server and an image formation apparatus, wherein the external apparatus comprises:
 a first controller having a first processor configured with processor executable instructions to perform operations comprising:
 operation as an input unit that acquires a user input of an image formation execution instruction, and that acquires a user input of destination information indicating a destination of notification information upon receipt of the user input of the image formation execution instruction;
 operation as an image formation data generator unit that generates image formation data based on which the image formation apparatus is to form an image;
 operation as a job generator unit that generates an image formation job by adding the destination information to the image formation data generated by the image formation data generator unit; and
 operation as an image formation job output unit that sends the image formation job generated by the job generator unit to the cloud server,
the cloud server comprises:
 a second controller having a second processor configured with processor executable instructions to perform operations comprising:
 operation as a first receiver unit that receives the image formation job from the external apparatus; and
 operation as a transmitter unit that sends the image formation job received by the first receiver unit to the image formation apparatus, and the image formation apparatus comprises:
 a third controller having a third processor configured with processor executable instructions to perform operations comprising:
 operation as a second receiver unit that receives the image formation job from the cloud server;
 operation as a determination unit that determines whether or not to impose restriction on processing of the image formation job received by the second receiver unit; and
 operation as a notification information transmitter unit that generates the notification information concerning the image formation job received by the second receiver unit and that sends the generated notification information to the destination indicated by the destination information contained in the image formation job received by the second receiver unit when the determination unit determines to impose the restriction, and
 does not generate the notification information concerning the image formation job received by the second receiver unit when the determination unit determines not to impose the restriction;
the cloud server further comprises a memory unit that stores the image formation job received by the first receiver unit; and
the second processor is configured to perform operations such that operation as the transmitter unit sends the image formation job to the image formation apparatus when a number of the image formation jobs stored in the memory unit reaches a predetermined threshold.

2. The image formation system according to claim 1, wherein the external apparatus further comprises a memory unit that stores user identification information prior to acquiring the user input of the image formation execution instruction by the first processor operating as the input unit; and
 the first processor is configured to, upon receipt of the user input of the image formation execution instruction from the first processor operating as the input unit, perform operations such that operation as the job generator unit generates the image formation job by adding the destination information and the user identification information.

3. The image formation system according to claim 2, wherein
 the third processor is configured to perform operations such that operation as the determination unit determines whether or not to impose restriction on processing of the image formation job based on the user identification information contained in the image formation job.

4. The image formation system according to claim 1, wherein
 the third processor is configured to perform operations such that:
 operation as the notification information transmitter unit generates, as the notification information, information indicating a result of determination made by the determination unit.

5. The image formation system according to claim 1, wherein the external apparatus is a mobile terminal that performs wireless communications.

6. An image formation system comprising an external apparatus, a cloud server and an image formation apparatus, wherein the external apparatus comprises:

a first controller having a first processor configured with processor executable instructions to perform operations comprising:

operation as an input unit that acquires a user input of an image formation execution instruction, and that acquires a user input of destination information indicating a destination of notification information upon receipt of the user input of the image formation execution instruction;

operation as an image formation data generator unit that generates image formation data based on which the image formation apparatus is to form an image;

operation as a job generator unit that generates an image formation job by adding the destination information to the image formation data generated by the image formation data generator unit; and operation as an image formation job output unit that sends the image formation job generated by the job generator unit to the cloud server, the cloud server comprises:

a second controller having a second processor configured with processor executable instructions to perform operations comprising:

operation as a first receiver unit that receives the image formation job from the external apparatus; and operation as a transmitter unit that sends the image formation job received by the first receiver unit to the image formation apparatus, and the image formation apparatus comprises:

a third controller having a third processor configured with processor executable instructions to perform operations comprising:

operation as a second receiver unit that receives the image formation job from the cloud server;

operation as a determination unit that determines whether or not to impose restriction on processing of the image formation job received by the second receiver unit; and operation as a notification information transmitter unit that generates the notification information concerning the image formation job received by the second receiver unit and that sends the generated notification information to the destination indicated by the destination information contained in the image formation job received by the second receiver unit when the determination unit determines to impose the restriction, and does not generate the notification information concerning the image formation job received by the second receiver unit when the determination unit determines not to impose the restriction;

the cloud server further comprises a memory unit that stores the image formation job received by the first receiver unit; and the second processor is configured to perform operations such that operation as the transmitter unit sends the image formation job to the image formation apparatus when a data amount of the image formation jobs stored in the memory unit reaches a predetermined threshold.

7. The image formation system according to claim 6, wherein the external apparatus further comprises a memory unit that stores user identification information prior to acquiring the user input of the image formation execution instruction by the first processor operating as the input unit; and the first processor is configured to, upon receipt of the user input of the image formation execution instruction from the first processor operating as the input unit, perform operations such that operation as the job generator unit generates the image formation job by adding the destination information and the user identification information.

8. The image formation system according to claim 7, wherein the third processor is configured to perform operations such that operation as the determination unit determines whether or not to impose restriction on processing of the image formation job based on the user identification information contained in the image formation job.

9. The image formation system according to claim 6, wherein the third processor is configured to perform operations such that:

operation as the notification information transmitter unit generates, as the notification information, information indicating a result of determination made by the determination unit.

10. The image formation system according to claim 6, wherein the external apparatus is a mobile terminal that performs wireless communications.

* * * * *